(12) United States Patent
Marten et al.

(10) Patent No.: US 10,101,717 B2
(45) Date of Patent: Oct. 16, 2018

(54) HOME AUTOMATION DATA STORAGE SYSTEM AND METHODS

(71) Applicant: EchoStar Technologies L.L.C., Englewood, CO (US)

(72) Inventors: Neil T. Marten, Lakewood, CO (US); Christopher B. Tirpak, Monument, CO (US)

(73) Assignee: EchoStar Technologies International Corporation, Englewood, CO (US)

( * ) Notice: Subject to any disclaimer, the term of this patent is extended or adjusted under 35 U.S.C. 154(b) by 263 days.

(21) Appl. No.: 14/970,235

(22) Filed: Dec. 15, 2015

(65) Prior Publication Data

US 2017/0168469 A1 Jun. 15, 2017

(51) Int. Cl.
 *G05B 15/02* (2006.01)
 *H04L 12/28* (2006.01)
 *H04N 21/00* (2011.01)

(52) U.S. Cl.
 CPC .......... *G05B 15/02* (2013.01); *H04L 12/2812* (2013.01); *H04N 21/00* (2013.01); *G05B 2219/2642* (2013.01)

(58) Field of Classification Search
 CPC ............ G05B 15/02; G05B 2219/2642; H04L 12/2812; H04N 21/00
 See application file for complete search history.

(56) References Cited

U.S. PATENT DOCUMENTS 3,803,575 A 4/1974 Gotanda
4,127,966 A 12/1978 Schmidt
4,386,436 A 5/1983 Kocher et al.
4,581,606 A 4/1986 Mallory
4,694,607 A 9/1987 Ishida et al.
(Continued)

FOREIGN PATENT DOCUMENTS

CA 2 267 988 A1 4/1998
CH 702136 B1 5/2011
(Continued)

OTHER PUBLICATIONS

Notification of Publication of European Application No. 15763643.2 as EP 3189511 dated Jul. 12, 2017, 1 page.
(Continued)

*Primary Examiner* — Pho M Luu
(74) *Attorney, Agent, or Firm* — Kilpatrick Townsend & Stockton LLP

(57) ABSTRACT

A home automation data storage system is provided that can include a plurality of home automation components, each component including a storage device. The system can also include a controller database for storing control data for the home automation system. The system can also include an electronic device communicatively coupled to the plurality of home automation components, the controller database, and a computing device, the electronic device having programming instructions that cause the electronic device to receive data from the computing device, store at least a portion of the data in the storage device of a component from the plurality of home automation components, and store information associating the storage device of the component and the at least a portion of the data in the controller database.

17 Claims, 9 Drawing Sheets

(56) References Cited

U.S. PATENT DOCUMENTS

| | | | |
|---|---|---|---|
| 4,728,949 A | 3/1988 | Platte et al. |
| 4,959,713 A | 9/1990 | Morotomi et al. |
| 5,400,246 A | 3/1995 | Wilson et al. |
| 5,770,896 A | 6/1998 | Nakajima |
| 5,805,442 A | 9/1998 | Crater et al. |
| 5,822,012 A | 10/1998 | Jeon et al. |
| 5,886,638 A | 3/1999 | Tanguay |
| 5,894,331 A | 4/1999 | Yang |
| 5,926,090 A | 7/1999 | Taylor et al. |
| 5,970,030 A | 10/1999 | Dimitri et al. |
| 6,081,758 A | 6/2000 | Parvulescu |
| 6,104,334 A | 8/2000 | Allport |
| 6,107,918 A | 8/2000 | Klein et al. |
| 6,107,935 A | 8/2000 | Comerford et al. |
| 6,111,517 A | 8/2000 | Atick et al. |
| 6,119,088 A | 9/2000 | Ciluffo |
| 6,142,913 A | 11/2000 | Ewert |
| 6,182,094 B1 | 1/2001 | Humpleman et al. |
| 6,225,938 B1 | 5/2001 | Hayes et al. |
| 6,286,764 B1 | 9/2001 | Garvey et al. |
| 6,330,621 B1 | 12/2001 | Bakke et al. |
| 6,337,899 B1 | 1/2002 | Alcendor et al. |
| 6,377,858 B1 | 4/2002 | Koeppe |
| 6,405,284 B1 | 6/2002 | Bridge |
| 6,415,257 B1 | 7/2002 | Jungua et al. |
| 6,445,287 B1 | 9/2002 | Schofield et al. |
| 6,502,166 B1 | 12/2002 | Cassidy |
| 6,529,230 B1 | 3/2003 | Chong |
| 6,543,051 B1 | 4/2003 | Manson et al. |
| 6,553,375 B1 | 4/2003 | Huang et al. |
| 6,663,375 B1 | 4/2003 | Huang et al. |
| 6,646,676 B1 | 11/2003 | DaGraca et al. |
| 6,662,282 B2 | 12/2003 | Cochran |
| 6,744,771 B1 | 6/2004 | Barber et al. |
| 6,748,343 B2 | 6/2004 | Alexander et al. |
| 6,751,657 B1 | 6/2004 | Zothner |
| 6,756,998 B1 | 6/2004 | Bilger |
| 6,792,319 B1 | 9/2004 | Bilger |
| 6,876,889 B1 | 4/2005 | Lortz et al. |
| 6,891,838 B1 | 5/2005 | Petite et al. |
| 6,931,104 B1 | 8/2005 | Foster et al. |
| 6,976,187 B2 | 12/2005 | Arnott et al. |
| 6,989,731 B1 | 1/2006 | Kawai et al. |
| 7,009,528 B2 | 3/2006 | Griep |
| 7,010,332 B1 | 3/2006 | Irvin et al. |
| 7,081,830 B2 * | 7/2006 | Shimba | G05B 19/042 340/12.31 |
| 7,082,359 B2 | 7/2006 | Breed |
| 7,088,238 B2 | 8/2006 | Karaoguz et al. |
| 7,103,545 B2 | 9/2006 | Furuta |
| 7,143,298 B2 | 11/2006 | Wells et al. |
| 7,216,002 B1 | 5/2007 | Anderson |
| 7,234,074 B2 | 6/2007 | Cohn et al. |
| 7,260,538 B2 | 8/2007 | Calderone et al. |
| 7,346,917 B2 | 3/2008 | Gatto et al. |
| 7,372,370 B2 | 5/2008 | Stults et al. |
| 7,386,666 B1 | 6/2008 | Beauchamp et al. |
| 7,391,319 B1 | 6/2008 | Walker |
| 7,395,369 B2 | 7/2008 | Sepez et al. |
| 7,395,546 B1 | 7/2008 | Asmussen |
| 7,529,677 B1 | 5/2009 | Wittenberg |
| 7,574,494 B1 | 8/2009 | Mayernick et al. |
| 7,579,945 B1 | 8/2009 | Richter et al. |
| 7,590,703 B2 | 9/2009 | Cashman et al. |
| 7,640,351 B2 | 12/2009 | Reckamp et al. |
| 7,659,814 B2 | 2/2010 | Chen et al. |
| 7,694,005 B2 | 4/2010 | Reckamp et al. |
| 7,739,718 B1 | 6/2010 | Young et al. |
| 7,861,034 B2 | 12/2010 | Yamamoto et al. |
| 7,870,232 B2 | 1/2011 | Reckamp et al. |
| 7,945,297 B2 | 5/2011 | Phillip |
| 7,969,318 B2 | 6/2011 | White et al. |
| 8,013,730 B2 | 9/2011 | Oh et al. |
| 8,042,048 B2 | 10/2011 | Wilson et al. |
| 8,086,757 B2 | 12/2011 | Chang |
| 8,106,768 B2 | 1/2012 | Neumann |
| 8,156,368 B2 | 4/2012 | Chambliss et al. |
| 8,171,148 B2 | 4/2012 | Lucas et al. |
| 8,179,248 B2 | 5/2012 | Eakle, Jr. |
| 8,180,735 B2 | 5/2012 | Ansari et al. |
| 8,201,261 B2 | 6/2012 | Barfield et al. |
| 8,221,290 B2 | 7/2012 | Vincent et al. |
| 8,275,143 B2 | 9/2012 | Johnson |
| 8,289,157 B2 | 10/2012 | Patenaude et al. |
| 8,290,545 B2 | 10/2012 | Terlizzi |
| 8,310,335 B2 | 11/2012 | Sivakkolundhu |
| 8,316,413 B2 | 11/2012 | Crabtree |
| 8,320,578 B2 | 11/2012 | Kahn et al. |
| 8,335,312 B2 | 12/2012 | Gerhardt et al. |
| 8,350,694 B1 | 1/2013 | Trundle et al. |
| 8,355,886 B2 | 1/2013 | Ollivier et al. |
| 8,413,204 B2 | 4/2013 | White et al. |
| 8,436,902 B2 | 5/2013 | Kuehnle |
| 8,498,572 B1 | 7/2013 | Schooley et al. |
| 8,516,087 B2 | 8/2013 | Wilson et al. |
| 8,533,144 B1 * | 9/2013 | Reeser | G06Q 30/02 705/14.53 |
| 8,539,567 B1 | 9/2013 | Logue et al. |
| 8,550,368 B2 | 10/2013 | Butler et al. |
| 8,619,136 B2 | 12/2013 | Howarter et al. |
| 8,620,841 B1 | 12/2013 | Filson et al. |
| 8,644,525 B2 | 2/2014 | Bathurst et al. |
| 8,645,327 B2 | 2/2014 | Falkenburg et al. |
| 8,667,529 B2 | 3/2014 | Taxier |
| 8,750,576 B2 | 6/2014 | Huang et al. |
| 8,780,201 B1 | 7/2014 | Scalisi et al. |
| 8,781,508 B1 | 7/2014 | Blakely |
| 8,786,698 B2 | 7/2014 | Chen et al. |
| 8,799,413 B2 | 8/2014 | Taylor et al. |
| 8,818,898 B2 | 8/2014 | Schlossberg et al. |
| 8,898,709 B2 | 11/2014 | Crabtree |
| 8,923,823 B1 | 12/2014 | Wilde |
| 8,930,700 B2 | 1/2015 | Wielopolski |
| 8,948,793 B1 | 2/2015 | Birkhold et al. |
| 8,965,170 B1 | 2/2015 | Benea et al. |
| 9,019,111 B1 | 4/2015 | Sloo et al. |
| 9,049,567 B2 | 6/2015 | Le Guen et al. |
| 9,191,804 B1 | 11/2015 | Paczkowski et al. |
| 9,237,141 B2 | 1/2016 | Logue et al. |
| 9,246,921 B1 | 1/2016 | Vlaminck et al. |
| 9,258,593 B1 | 2/2016 | Chen et al. |
| 9,286,482 B1 | 3/2016 | Dumont et al. |
| 9,338,054 B2 | 5/2016 | Russell |
| 9,347,242 B2 | 5/2016 | Cregg et al. |
| 9,353,500 B1 | 5/2016 | Andreski |
| 9,443,142 B2 | 9/2016 | Reynolds, Jr. |
| 9,462,041 B1 | 10/2016 | Hagins et al. |
| 9,495,860 B2 | 11/2016 | Lett |
| 9,511,259 B2 | 12/2016 | Mountain |
| 9,589,448 B1 | 3/2017 | Schneider et al. |
| 9,599,981 B2 | 3/2017 | Crabtree |
| 9,621,959 B2 | 4/2017 | Mountain |
| 9,628,286 B1 | 4/2017 | Nguyen et al. |
| 9,632,746 B2 | 4/2017 | Keipert et al. |
| 9,633,186 B2 | 4/2017 | Ingrassia, Jr. et al. |
| 9,729,989 B2 | 8/2017 | Marten |
| 9,769,522 B2 | 9/2017 | Richardson |
| 9,772,612 B2 | 9/2017 | McCarthy et al. |
| 9,798,309 B2 | 10/2017 | Tirpak |
| 9,824,578 B2 | 11/2017 | Burton et al. |
| 9,835,434 B1 * | 12/2017 | Sloo | G01B 7/02 |
| 9,838,736 B2 | 12/2017 | Smith et al. |
| 9,882,736 B2 | 1/2018 | Lett |
| 9,888,129 B2 | 2/2018 | Russell |
| 9,900,177 B2 | 2/2018 | Holley |
| 9,912,492 B2 | 3/2018 | McCarthy et al. |
| 9,967,614 B2 | 5/2018 | McCarthy |
| 9,977,587 B2 | 5/2018 | Mountain |
| 9,983,011 B2 | 5/2018 | Mountain |
| 9,989,507 B2 | 6/2018 | Benn |
| 2001/0012998 A1 | 8/2001 | Jouet et al. |
| 2002/0003493 A1 | 1/2002 | Durst et al. |
| 2002/0019725 A1 | 2/2002 | Petite |
| 2002/0063633 A1 | 5/2002 | Park |

(56) References Cited

U.S. PATENT DOCUMENTS

| | | |
|---|---|---|
| 2002/0080238 A1 | 6/2002 | Ohmura |
| 2002/0193989 A1 | 12/2002 | Geilhufe et al. |
| 2003/0005431 A1 | 1/2003 | Shinohara |
| 2003/0052789 A1 | 3/2003 | Colmenarez et al. |
| 2003/0097452 A1 | 5/2003 | Kim et al. |
| 2003/0126593 A1 | 7/2003 | Mault |
| 2003/0133551 A1 | 7/2003 | Kahn |
| 2003/0140352 A1 | 7/2003 | Kim |
| 2003/0154242 A1 | 8/2003 | Hayes et al. |
| 2003/0192600 A1 | 10/2003 | Ford |
| 2003/0201900 A1 | 10/2003 | Bachinski et al. |
| 2004/0019489 A1 | 1/2004 | Funk et al. |
| 2004/0036579 A1 | 2/2004 | Megerle |
| 2004/0117038 A1 | 6/2004 | Karaoguz et al. |
| 2004/0117843 A1 | 6/2004 | Karaoguz et al. |
| 2004/0121725 A1 | 6/2004 | Matsui |
| 2004/0128034 A1 | 7/2004 | Lenker et al. |
| 2004/0143838 A1 | 7/2004 | Rose |
| 2004/0148419 A1 | 7/2004 | Chen et al. |
| 2004/0148632 A1 | 7/2004 | Park et al. |
| 2004/0260407 A1 | 12/2004 | Wimsatt |
| 2004/0266419 A1 | 12/2004 | Arling et al. |
| 2005/0038875 A1 | 2/2005 | Park |
| 2005/0049862 A1 | 3/2005 | Choi et al. |
| 2005/0106267 A1 | 5/2005 | Frykman et al. |
| 2005/0159823 A1 | 7/2005 | Hayes et al. |
| 2005/0166065 A1 | 7/2005 | Eytchison et al. |
| 2005/0188315 A1 | 8/2005 | Campbell et al. |
| 2005/0200478 A1 | 9/2005 | Koch et al. |
| 2005/0245292 A1 | 11/2005 | Bennett et al. |
| 2005/0252622 A1 | 11/2005 | Reid |
| 2005/0264698 A1 | 12/2005 | Eshleman |
| 2005/0289614 A1 | 12/2005 | Baek et al. |
| 2006/0011145 A1 | 1/2006 | Kates |
| 2006/0059977 A1 | 3/2006 | Kates |
| 2006/0087428 A1 | 4/2006 | Wolfe et al. |
| 2006/0115156 A1 | 6/2006 | Nakajima et al. |
| 2006/0136968 A1 | 6/2006 | Han et al. |
| 2006/0143679 A1 | 6/2006 | Yamada et al. |
| 2006/0155389 A1 | 7/2006 | Pessolano et al. |
| 2006/0186740 A1 | 8/2006 | Von Gunten |
| 2006/0192680 A1 | 8/2006 | Scuka et al. |
| 2006/0244624 A1 | 11/2006 | Wang et al. |
| 2006/0253894 A1 | 11/2006 | Bookman et al. |
| 2007/0044119 A1 | 2/2007 | Sullivan et al. |
| 2007/0078910 A1 | 4/2007 | Bopardikar |
| 2007/0129220 A1 | 6/2007 | Bardha |
| 2007/0135225 A1 | 6/2007 | Nieminen et al. |
| 2007/0142022 A1 | 6/2007 | Madonna et al. |
| 2007/0146545 A1 | 6/2007 | Iwahashi |
| 2007/0150460 A1 | 6/2007 | Evans |
| 2007/0157258 A1 | 7/2007 | Jung et al. |
| 2007/0192486 A1 | 8/2007 | Wilson et al. |
| 2007/0194922 A1 | 8/2007 | Nathan et al. |
| 2007/0256085 A1 | 11/2007 | Reckamp et al. |
| 2007/0271518 A1 | 11/2007 | Tischer et al. |
| 2007/0275670 A1 | 11/2007 | Chen et al. |
| 2007/0279244 A1 | 12/2007 | Haughawout et al. |
| 2007/0280504 A1 | 12/2007 | Badawy et al. |
| 2008/0019392 A1 | 1/2008 | Lee |
| 2008/0021971 A1 | 1/2008 | Halgas |
| 2008/0022322 A1 | 1/2008 | Grannan et al. |
| 2008/0046930 A1 | 2/2008 | Smith et al. |
| 2008/0062258 A1 | 3/2008 | Bentkovski et al. |
| 2008/0062965 A1 | 3/2008 | Silva et al. |
| 2008/0092199 A1 | 4/2008 | McCarthy et al. |
| 2008/0109095 A1 | 5/2008 | Braithwaite et al. |
| 2008/0114963 A1 | 5/2008 | Cannon et al. |
| 2008/0120639 A1 | 5/2008 | Walter et al. |
| 2008/0123825 A1 | 5/2008 | Abramson et al. |
| 2008/0140736 A1 | 6/2008 | Jarno |
| 2008/0144884 A1 | 6/2008 | Habibi |
| 2008/0163330 A1 | 7/2008 | Sparrell |
| 2008/0179053 A1 | 7/2008 | Kates |
| 2008/0236214 A1 | 10/2008 | Han |
| 2008/0278635 A1 | 11/2008 | Hardacker et al. |
| 2008/0284905 A1 | 11/2008 | Chuang |
| 2008/0288876 A1 | 11/2008 | Fleming |
| 2008/0297660 A1 | 12/2008 | Shioya |
| 2009/0023554 A1 | 1/2009 | Shim |
| 2009/0027225 A1 | 1/2009 | Farley |
| 2009/0033505 A1 | 2/2009 | Jones et al. |
| 2009/0040013 A1 | 2/2009 | Ebrom et al. |
| 2009/0066320 A1 | 3/2009 | Posey |
| 2009/0069038 A1 | 3/2009 | Olague et al. |
| 2009/0083374 A1 | 3/2009 | Saint Clair |
| 2009/0112541 A1 | 4/2009 | Anderson et al. |
| 2009/0138507 A1 | 5/2009 | Burckart et al. |
| 2009/0146834 A1 | 6/2009 | Huang |
| 2009/0165069 A1 | 6/2009 | Kirchner |
| 2009/0167555 A1 | 7/2009 | Kohanek |
| 2009/0190040 A1 | 7/2009 | Watanabe et al. |
| 2009/0235992 A1 | 9/2009 | Armstrong |
| 2009/0249428 A1 | 10/2009 | White et al. |
| 2009/0270065 A1 | 10/2009 | Hamada et al. |
| 2009/0271203 A1 | 10/2009 | Resch et al. |
| 2009/0286654 A1 | 11/2009 | Rice |
| 2009/0307715 A1 | 12/2009 | Santamaria et al. |
| 2010/0031286 A1 | 2/2010 | Gupta et al. |
| 2010/0045471 A1 | 2/2010 | Meyers |
| 2010/0046918 A1 | 2/2010 | Takao et al. |
| 2010/0066507 A1 | 3/2010 | Myllymaki |
| 2010/0083371 A1 | 4/2010 | Bennetts et al. |
| 2010/0097225 A1 | 4/2010 | Petricoin, Jr. |
| 2010/0102082 A1 | 4/2010 | Ebrom et al. |
| 2010/0122284 A1 | 5/2010 | Yoon et al. |
| 2010/0131280 A1 | 5/2010 | Bogineni |
| 2010/0138007 A1 | 6/2010 | Clark et al. |
| 2010/0138858 A1 | 6/2010 | Velazquez et al. |
| 2010/0146445 A1 | 6/2010 | Kraut |
| 2010/0161082 A1 | 6/2010 | Ebrom et al. |
| 2010/0164732 A1 | 7/2010 | Wedig et al. |
| 2010/0211546 A1 | 8/2010 | Grohman et al. |
| 2010/0277300 A1 | 11/2010 | Cohn et al. |
| 2010/0283579 A1 | 11/2010 | Kraus et al. |
| 2010/0309004 A1 | 12/2010 | Grundler et al. |
| 2010/0321151 A1 | 12/2010 | Matsuura et al. |
| 2011/0003665 A1 | 1/2011 | Burton et al. |
| 2011/0018693 A1 | 1/2011 | Lim et al. |
| 2011/0030016 A1 | 2/2011 | Pino, Jr. et al. |
| 2011/0032423 A1 | 2/2011 | Jing et al. |
| 2011/0093126 A1 | 4/2011 | Toba et al. |
| 2011/0119325 A1 | 5/2011 | Paul et al. |
| 2011/0139076 A1 | 6/2011 | Pu et al. |
| 2011/0140832 A1 | 6/2011 | Vinkenvleugel et al. |
| 2011/0150432 A1 | 6/2011 | Paul et al. |
| 2011/0156862 A1 | 6/2011 | Langer |
| 2011/0157468 A1 | 6/2011 | Dai |
| 2011/0167250 A1 | 7/2011 | Dicks et al. |
| 2011/0187928 A1 | 8/2011 | Crabtree |
| 2011/0187930 A1 | 8/2011 | Crabtree |
| 2011/0187931 A1 | 8/2011 | Kim |
| 2011/0202956 A1 | 8/2011 | Connelly et al. |
| 2011/0267180 A1 | 11/2011 | Ferringo et al. |
| 2011/0270549 A1 | 11/2011 | Jeansonne et al. |
| 2011/0282837 A1 | 11/2011 | Gounares et al. |
| 2011/0283311 A1 | 11/2011 | Luong |
| 2011/0285528 A1 | 11/2011 | Weinstein et al. |
| 2011/0295396 A1 | 12/2011 | Chinen et al. |
| 2011/0296463 A1 | 12/2011 | Suslov |
| 2012/0019388 A1 | 1/2012 | Kates |
| 2012/0047083 A1 | 2/2012 | Qiao et al. |
| 2012/0047532 A1 | 2/2012 | McCarthy |
| 2012/0059495 A1 | 3/2012 | Weiss et al. |
| 2012/0069246 A1 | 3/2012 | Thornberry et al. |
| 2012/0092183 A1 | 4/2012 | Corbett et al. |
| 2012/0094696 A1 | 4/2012 | Ahn et al. |
| 2012/0105724 A1 | 5/2012 | Candelore |
| 2012/0124245 A1 | 5/2012 | Reeves et al. |
| 2012/0124456 A1 | 5/2012 | Perez et al. |
| 2012/0124859 A1 | 5/2012 | May et al. |
| 2012/0154108 A1 | 6/2012 | Sugaya |
| 2012/0154138 A1 | 6/2012 | Cohn et al. |
| 2012/0164975 A1 | 6/2012 | Dodeja et al. |

(56) References Cited

U.S. PATENT DOCUMENTS

| | | |
|---|---|---|
| 2012/0167646 A1 | 7/2012 | Sharma et al. |
| 2012/0206269 A1 | 8/2012 | Wickman et al. |
| 2012/0226366 A1 | 9/2012 | Lee et al. |
| 2012/0226768 A1 | 9/2012 | Gaines et al. |
| 2012/0271472 A1 | 10/2012 | Brunner et al. |
| 2012/0271670 A1 | 10/2012 | Zaloom |
| 2012/0280802 A1 | 11/2012 | Yoshida et al. |
| 2012/0291068 A1 | 11/2012 | Khushoo et al. |
| 2012/0314713 A1 | 12/2012 | Singh et al. |
| 2012/0316876 A1 | 12/2012 | Jang et al. |
| 2012/0326835 A1 | 12/2012 | Cockrell et al. |
| 2013/0006400 A1 | 1/2013 | Caceres et al. |
| 2013/0013106 A1 | 1/2013 | Carelli et al. |
| 2013/0031037 A1 | 1/2013 | Brandt et al. |
| 2013/0046800 A1 | 2/2013 | Assi et al. |
| 2013/0049950 A1 | 2/2013 | Wohlert |
| 2013/0053063 A1 | 2/2013 | McSheffrey |
| 2013/0060358 A1 | 3/2013 | Li et al. |
| 2013/0070044 A1 | 3/2013 | Naidoo et al. |
| 2013/0074061 A1 | 3/2013 | Averbuch et al. |
| 2013/0090213 A1 | 4/2013 | Amini et al. |
| 2013/0120137 A1 | 5/2013 | Lehmann |
| 2013/0124192 A1 | 5/2013 | Lindmark et al. |
| 2013/0138757 A1 | 5/2013 | Ferron |
| 2013/0147604 A1 | 6/2013 | Jones, Jr. et al. |
| 2013/0152139 A1 | 6/2013 | Davis et al. |
| 2013/0158717 A1 | 6/2013 | Zywicki et al. |
| 2013/0166073 A1 | 6/2013 | Pine et al. |
| 2013/0179926 A1 | 7/2013 | White et al. |
| 2013/0185750 A1 | 7/2013 | Ayoub |
| 2013/0204408 A1 | 8/2013 | Thiruvengada et al. |
| 2013/0219482 A1 | 8/2013 | Brandt |
| 2013/0238326 A1 | 9/2013 | Kim et al. |
| 2013/0242074 A1 | 9/2013 | Sekiguchi et al. |
| 2013/0247117 A1 | 9/2013 | Yamada et al. |
| 2013/0249688 A1 | 9/2013 | Nguyen et al. |
| 2013/0267383 A1 | 10/2013 | Watterson |
| 2013/0278828 A1 | 10/2013 | Todd |
| 2013/0289788 A1 | 10/2013 | Gupta et al. |
| 2013/0300576 A1 | 11/2013 | Sinsuan et al. |
| 2013/0318559 A1 | 11/2013 | Crabtree |
| 2013/0321637 A1 | 12/2013 | Frank et al. |
| 2013/0324247 A1 | 12/2013 | Esaki et al. |
| 2013/0325150 A1 | 12/2013 | Bury |
| 2014/0022051 A1 | 1/2014 | Levien et al. |
| 2014/0025798 A1 | 1/2014 | Apte et al. |
| 2014/0028546 A1 | 1/2014 | Jeon et al. |
| 2014/0070959 A1 | 3/2014 | Bhargava et al. |
| 2014/0089671 A1 | 3/2014 | Logue et al. |
| 2014/0095684 A1 | 4/2014 | Nonaka et al. |
| 2014/0101465 A1 | 4/2014 | Wang et al. |
| 2014/0129006 A1 | 5/2014 | Chen et al. |
| 2014/0135993 A1 | 5/2014 | Kang et al. |
| 2014/0140575 A1 | 5/2014 | Wolf |
| 2014/0142724 A1 | 5/2014 | Park et al. |
| 2014/0160360 A1 | 6/2014 | Hsu et al. |
| 2014/0167969 A1 | 6/2014 | Wedig et al. |
| 2014/0168277 A1 | 6/2014 | Ashley et al. |
| 2014/0181855 A1 | 6/2014 | Fife et al. |
| 2014/0192197 A1 | 7/2014 | Hanko et al. |
| 2014/0192997 A1 | 7/2014 | Niu et al. |
| 2014/0201315 A1 | 7/2014 | Jacob et al. |
| 2014/0215505 A1 | 7/2014 | Balasubramanian et al. |
| 2014/0217905 A1 | 8/2014 | Clayton et al. |
| 2014/0218517 A1 | 8/2014 | Kim et al. |
| 2014/0222634 A1 | 8/2014 | Gordon et al. |
| 2014/0223548 A1 | 8/2014 | Wassingbo |
| 2014/0228062 A1 | 8/2014 | Rubowitz |
| 2014/0266669 A1 | 9/2014 | Fadell et al. |
| 2014/0266684 A1 | 9/2014 | Poder et al. |
| 2014/0282653 A1 | 9/2014 | Ariantaj et al. |
| 2014/0297001 A1 | 10/2014 | Silverman |
| 2014/0306833 A1 | 10/2014 | Ricci |
| 2014/0310075 A1 | 10/2014 | Ricci |
| 2014/0313014 A1 | 10/2014 | Huh et al. |
| 2014/0313032 A1 | 10/2014 | Sager et al. |
| 2014/0333529 A1 | 11/2014 | Kim et al. |
| 2014/0351832 A1 | 11/2014 | Cho et al. |
| 2014/0362201 A1 | 12/2014 | Nguyen et al. |
| 2014/0373074 A1 | 12/2014 | Hwang et al. |
| 2015/0008846 A1 | 1/2015 | Chen et al. |
| 2015/0015401 A1 | 1/2015 | Wedig et al. |
| 2015/0029096 A1 | 1/2015 | Ishihara |
| 2015/0054910 A1 | 2/2015 | Offen et al. |
| 2015/0061859 A1 | 3/2015 | Matsuoka et al. |
| 2015/0062343 A1 | 3/2015 | Hwang et al. |
| 2015/0066173 A1 | 3/2015 | Ellis et al. |
| 2015/0074259 A1 | 3/2015 | Ansari et al. |
| 2015/0082225 A1 | 3/2015 | Shearer |
| 2015/0084770 A1 | 3/2015 | Xiao et al. |
| 2015/0085184 A1 | 3/2015 | Vidal et al. |
| 2015/0097689 A1 | 4/2015 | Logue et al. |
| 2015/0100167 A1 | 4/2015 | Sloo et al. |
| 2015/0105880 A1 | 4/2015 | Slupik et al. |
| 2015/0106866 A1 | 4/2015 | Fujita |
| 2015/0113571 A1 | 4/2015 | Cholas et al. |
| 2015/0116113 A1 | 4/2015 | Caine et al. |
| 2015/0127712 A1 | 5/2015 | Fadell et al. |
| 2015/0131500 A1 | 5/2015 | Xie et al. |
| 2015/0137967 A1 | 5/2015 | Wedig et al. |
| 2015/0142991 A1 | 5/2015 | Zaloom |
| 2015/0143406 A1 | 5/2015 | Cho et al. |
| 2015/0143408 A1 | 5/2015 | Sallas |
| 2015/0145643 A1 | 5/2015 | Fadell et al. |
| 2015/0154850 A1 | 6/2015 | Fadell et al. |
| 2015/0156030 A1 | 6/2015 | Fadell et al. |
| 2015/0156031 A1 | 6/2015 | Fadell et al. |
| 2015/0156612 A1 | 6/2015 | Vemulapalli |
| 2015/0159401 A1 | 6/2015 | Patrick et al. |
| 2015/0160623 A1 | 6/2015 | Holley |
| 2015/0160634 A1 | 6/2015 | Smith et al. |
| 2015/0160635 A1 | 6/2015 | Schofield et al. |
| 2015/0160636 A1 | 6/2015 | McCarthy et al. |
| 2015/0160663 A1 | 6/2015 | McCarthy et al. |
| 2015/0160935 A1 | 6/2015 | Nye |
| 2015/0161452 A1 | 6/2015 | McCarthy et al. |
| 2015/0161882 A1 | 6/2015 | Lett |
| 2015/0162006 A1 | 6/2015 | Kummer |
| 2015/0163411 A1 | 6/2015 | McCarthy, III et al. |
| 2015/0163412 A1 | 6/2015 | Holley et al. |
| 2015/0163535 A1 | 6/2015 | McCarthy et al. |
| 2015/0172742 A1 | 6/2015 | Richardson |
| 2015/0180708 A1 | 6/2015 | Jacob et al. |
| 2015/0192914 A1 | 7/2015 | Slupik |
| 2015/0198941 A1 | 7/2015 | Pederson |
| 2015/0241860 A1 | 8/2015 | Raid |
| 2015/0260424 A1 | 9/2015 | Fadell et al. |
| 2015/0281824 A1 | 10/2015 | Nguyen et al. |
| 2015/0304689 A1* | 10/2015 | Warren ............... H04N 21/231 725/92 |
| 2015/0309487 A1 | 10/2015 | Lyman |
| 2015/0325096 A1 | 11/2015 | Hatch |
| 2015/0334069 A1 | 11/2015 | Winston et al. |
| 2015/0341599 A1 | 11/2015 | Carey |
| 2015/0347910 A1 | 12/2015 | Fadell et al. |
| 2015/0365787 A1 | 12/2015 | Farrell |
| 2016/0029153 A1 | 1/2016 | Linn et al. |
| 2016/0041565 A1 | 2/2016 | Edwards |
| 2016/0047569 A1 | 2/2016 | Fadell et al. |
| 2016/0063854 A1 | 3/2016 | Burton et al. |
| 2016/0066046 A1 | 3/2016 | Mountain |
| 2016/0091471 A1 | 3/2016 | Benn |
| 2016/0098309 A1 | 4/2016 | Kim |
| 2016/0100696 A1 | 4/2016 | Palashewski et al. |
| 2016/0109864 A1 | 4/2016 | Lonn |
| 2016/0116914 A1 | 4/2016 | Mucci |
| 2016/0121161 A1 | 5/2016 | Mountain |
| 2016/0123741 A1 | 5/2016 | Mountain |
| 2016/0163168 A1 | 6/2016 | Brav et al. |
| 2016/0182249 A1 | 6/2016 | Lea |
| 2016/0189527 A1 | 6/2016 | Peterson et al. |
| 2016/0191912 A1 | 6/2016 | Lea et al. |
| 2016/0191990 A1 | 6/2016 | McCarthy |
| 2016/0195602 A1 | 7/2016 | Meadow |

(56) References Cited

U.S. PATENT DOCUMENTS

| | | |
|---|---|---|
| 2016/0195856 A1 | 7/2016 | Spero |
| 2016/0196731 A1 | 7/2016 | Aich et al. |
| 2016/0203700 A1 | 7/2016 | Bruhn et al. |
| 2016/0234034 A1 | 8/2016 | Mahar et al. |
| 2016/0248598 A1 | 8/2016 | Lin et al. |
| 2016/0256485 A1 | 9/2016 | Wager et al. |
| 2016/0260135 A1 | 9/2016 | Zomet et al. |
| 2016/0285644 A1 | 9/2016 | Lu et al. |
| 2016/0286327 A1 | 9/2016 | Marten |
| 2016/0323548 A1 | 11/2016 | Khot et al. |
| 2016/0334811 A1 | 11/2016 | Marten |
| 2016/0335423 A1 | 11/2016 | Beals |
| 2016/0338179 A1 | 11/2016 | Aliakseyeu et al. |
| 2016/0342379 A1 | 11/2016 | Keipert et al. |
| 2016/0366746 A1 | 12/2016 | van de Ven et al. |
| 2017/0005822 A1 | 1/2017 | Gao |
| 2017/0041886 A1 | 2/2017 | Baker et al. |
| 2017/0048476 A1 | 2/2017 | Freiin von Kapri et al. |
| 2017/0051925 A1 | 2/2017 | Stefanski et al. |
| 2017/0054615 A1 | 2/2017 | Wilson |
| 2017/0061750 A1 | 3/2017 | Eyring et al. |
| 2017/0065433 A1 | 3/2017 | Singh et al. |
| 2017/0082987 A1 | 3/2017 | Reddy et al. |
| 2017/0105190 A1 | 4/2017 | Logan et al. |
| 2017/0127124 A9 | 5/2017 | Wilson et al. |
| 2017/0146964 A1 | 5/2017 | Beals |
| 2017/0176961 A1 | 6/2017 | Tirpak |
| 2017/0187993 A1 | 6/2017 | Martch et al. |
| 2017/0191693 A1 | 7/2017 | Bruhn et al. |
| 2017/0191695 A1 | 7/2017 | Bruhn et al. |
| 2017/0195130 A1 | 7/2017 | Landow et al. |
| 2018/0027290 A1 | 1/2018 | Richardson |
| 2018/0038029 A1 | 2/2018 | Beals |
| 2018/0061158 A1 | 3/2018 | Greene |

FOREIGN PATENT DOCUMENTS

| | | |
|---|---|---|
| CN | 105814555 A | 7/2016 |
| DE | 3707284 A1 | 9/1988 |
| DE | 4012253 C1 | 4/1991 |
| DE | 10 208 451 A1 | 9/2003 |
| DE | 10 2012 106 719 A1 | 1/2014 |
| EP | 720136 A2 | 7/1996 |
| EP | 743410 A2 | 11/1996 |
| EP | 2 736 027 A1 | 5/2014 |
| EP | 3 080 677 A1 | 10/2016 |
| EP | 3 080 710 A1 | 10/2016 |
| FR | 834856 A | 12/1938 |
| FR | 947943 A | 7/1949 |
| GB | 1445705 A | 8/1976 |
| GB | 2 304 952 A | 3/1997 |
| JP | 2008148016 A | 6/2008 |
| WO | 93/20544 A1 | 10/1993 |
| WO | 2004/068386 A1 | 8/2004 |
| WO | 2011/095567 A1 | 8/2011 |
| WO | 2011/149473 A1 | 12/2011 |
| WO | 2014/068556 A1 | 5/2014 |
| WO | 2015/179120 A1 | 11/2015 |
| WO | 2016/034880 A1 | 3/2016 |
| WO | 2016/066399 A1 | 5/2016 |
| WO | 2016/066442 A1 | 5/2016 |
| WO | 2016/182696 A1 | 11/2016 |
| WO | 2017/116533 A1 | 7/2017 |
| WO | 2018/039161 A1 | 3/2018 |

OTHER PUBLICATIONS

Notification of Publication of Brazilian Application No. BR 11 2016 0112032 dated Aug. 8, 2017, 2 pages.
Notification of Publication of Brazilian Application No. BR 11 2016 010376 9 dated Aug. 8, 2017, 1 page.
Supplementary European Search Report for EP 14868928 dated Jul. 7, 2017, 11 pages.
Supplementary European Search Report for EP 14870507 dated Jun. 28, 2017, all pages. (Received in KTS FIP in Sep. 2017, all refs from SR already cited).
"Plug-In Carbon Monoxide & Natural Gas Alarm with Backup Battery Protection," Universal Security Instruments, Inc. , 2011, 12 pages.
U.S. Appl. No. 14/553,763, filed Nov. 25, 2014 Preinterview first office action dated Oct. 6, 2017, all pages.
U.S. Appl. No. 14/584,075, filed Dec. 29, 2014, Final Rejection dated Sep. 9, 2017, all pages.
U.S. Appl. No. 14/952,580, filed Nov. 25, 2015, Non-Final Rejection dated Sep. 20, 2017, all pages.
U.S. Appl. No. 15/189,775, filed Jun. 22, 2016, Notice of Allowance dated Sep. 11, 2017, all pages.
U.S. Appl. No. 14/986,496, filed Dec. 31, 2015, Non-Final Rejection dated Sep. 26, 2017, all pages.
U.S. Appl. No. 14/710,331, filed May 12, 2015, Final Rejection dated Aug. 16, 2017, all pages.
Notification of Publication of European Application No. 162004220 as EP 3166308 dated May 10, 2017, 2 pages.
U.S. Appl. No. 14/567,765, filed Dec. 11, 2014, Notice of Allowance dated May 24, 2017, all pages.
U.S. Appl. No. 14/567,754, filed Dec. 11, 2014, Final Rejection dated May 26, 2017, all pages.
U.S. Appl. No. 14/567,770, filed Dec. 11, 2014, Final Rejection dated Jun. 1, 2017, all pages.
U.S. Appl. No. 14/476,377, filed Sep. 3, 2014, Notice of Allowance dated May 19, 2017, all pages.
U.S. Appl. No. 14/832,821, filed Aug. 21, 2015, Non-Final Rejection dated Apr. 24, 2017, all pages.
U.S. Appl. No. 14/981,501, filed Dec. 28, 2015, Preinterview first office action dated Apr. 20, 2017, all pages.
U.S. Appl. No. 14/709,791, filed May 12, 2015, Non Final Rejection dated May 31, 2017, all pages.
U.S. Appl. No. 12/700,310, filed Feb. 4, 2010 Notice of Allowance dated Nov. 8, 2016, all pages.
U.S. Appl. No. 14/567,765, filed Dec. 11, 2014, First Action interview dated Oct. 18, 2016, all pages.
U.S. Appl. No. 14/584,075, filed Dec. 29, 2014, Final Rejection dated Oct. 6, 2016, all pages.
U.S. Appl. No. 14/566,977, filed Dec. 11, 2014, Non Final Rejection dated Oct. 3, 2016, all pages.
U.S. Appl. No. 14/567,754, filed Dec. 11, 2014, Non Final Rejection dated Nov. 4, 2016, all pages.
U.S. Appl. No. 14/567,770, filed Dec. 11, 2014, Non Final Rejection dated Nov. 4, 2016, all pages.
U.S. Appl. No. 14/671,299, filed Mar. 27, 2015, Non Final Rejection dated Oct. 28, 2016, all pages.
U.S. Appl. No. 14/476,377, filed Sep. 3, 2014, Non-Final Rejection dated Nov. 7, 2016, all pages.
Office Action for EP14868928.4 dated Sep. 23, 2016, all pages.
International Preliminary Report on Patentability for PCT/US2016/028126 dated Nov. 14, 2017, all pages.
International Search Report and Written Opinion for PCT/US2017/047900 dated Nov. 24, 2017.
Ravindran, et al., "Information-centric Networking based Homenet," 2013 IFIP/IEEE International Symposium on Integrated Network Management (IM 2013), Ghent, 2013, pp. 1102-1108.
Mantoro, et al., "Web-enabled Smart Home Using Wireless Node Infrastructure," Proceedings of the 9th International Conference on Advances in Mobile Computing and Multimedia. ACM, 2011, pp. 72-79.
Shariqsuhail, et al., "Multi-Functional Secured Smart Home," Advances in Computing, Communications and Informatics (ICACCI), 2016 International Conference on. IEEE, 2016, pp. 2629-2634.
U.S. Appl. No. 14/986,483, filed Dec. 31, 2015, Non-Final Rejection dated Dec. 1, 2017, all pages.
U.S. Appl. No. 14/832,821, filed Aug. 21, 2015, Notice of Allowance dated Dec. 18, 2017, all pages.
International Search Report and Written Opinion for PCT/US2016/028126 dated Jun. 3, 2016, all pages.
U.S. Appl. No. 12/700,310, filed Feb. 4, 2010 Non-Final Office Action dated Jun. 16, 2016, 30 pages.

(56) References Cited

OTHER PUBLICATIONS

U.S. Appl. No. 14/528,739, filed Oct. 30, 2014 Notice of Allowance dated Jun. 23, 2016, 34 pages.
U.S. Appl. No. 14/485,188, filed Sep. 12, 2014, Non-Final Rejection dated Jun. 17, 2016, 29 pages.
U.S. Appl. No. 14/710,331, filed May 12, 2015, Non-Final Rejection dated May 20, 2016, 42 pages.
International Search Report and Written Opinion for PCT/EP2011/051608 dated May 30, 2011, 13 pages.
International Preliminary Report on Patentability for PCT/EP2011/051608 dated Aug. 16, 2012, 8 pages.
International Search Report and Written Opinion for PCT/US2014/053876 dated Nov. 26, 2014, 8 pages.
International Search Report and Written Opinion for PCT/US2014/055441 dated Dec. 4, 2014, 10 pages.
International Search Report and Written Opinion for PCT/US2014/055476 dated Dec. 30, 2014, 10 pages.
Mexican Institute of Industrial Property Office Action dated Nov. 1, 2013, for Mex. Patent Appln No. MX/a/2012/008882 is not translated into English, 3 pages.
Mexican Institute of Industrial Property Notice of Allowance dated Feb. 10, 2014, for Mex. Patent Appln No. MX/a/2012/008882, 1 page.
U.S. Appl. No. 14/470,352, filed Aug. 27, 2014 Non Final Office Action dated Nov. 20, 2015, 28 pages.
U.S. Appl. No. 12/700,310, filed Feb. 4, 2010 Office Action dated May 4, 2012, 15 pages.
U.S. Appl. No. 12/700,310, filed Feb. 4, 2010 Final Office Action dated Oct. 10, 2012, 16 pages.
U.S. Appl. No. 12/700,310, filed Feb. 4, 2010 Non-Final Office Action dated Apr. 1, 2013, 16 pages.
U.S. Appl. No. 12/700,310, filed Feb. 4, 2010 Non-Final Office Action dated Oct. 15, 2013, 15 pages.
U.S. Appl. No. 12/700,310, filed Feb. 4, 2010 Final Office Action dated Feb. 28, 2014, 17 pages.
U.S. Appl. No. 12/700,310, filed Feb. 4, 2010 Non-Final Office Action dated Aug. 14, 2014, 18 pages.
U.S. Appl. No. 12/700,310, filed Feb. 4, 2010 Non-Final Office Action dated Mar. 11, 2015, 35 pages.
U.S. Appl. No. 12/700,310, filed Feb. 4, 2010 Final Office Action dated Oct. 26, 2015, 19 pages.
U.S. Appl. No. 12/700,408, filed Feb. 4, 2010 Notice of Allowance dated Jul. 28, 2012, 8 pages.
U.S. Appl. No. 13/680,934, filed Nov. 19, 2012 Non-Final Office Action dated Oct. 2, 2013, 7 pages.
U.S. Appl. No. 13/680,934, filed Nov. 19, 2012 Final Office Action dated Feb. 10, 2014, 13 pages.
U.S. Appl. No. 13/680,934, filed Nov. 19, 2012 Notice of Allowance dated Apr. 30, 2014, 9 pages.
U.S. Appl. No. 13/680,934, filed Nov. 19, 2012 Notice of Allowance dated Jul. 25, 2014, 12 pages.
U.S. Appl. No. 14/107,132, filed Dec. 16, 2013 Non Final Office Action dated May 27, 2015, 26 pages.
U.S. Appl. No. 14/485,188, filed Sep. 12, 2014 Pre-Interview First Office Action dated Jul. 29, 2015, 20 pages.
U.S. Appl. No. 14/485,188, filed Sep. 12, 2014 Pre-Interview First Office Action dated Oct. 1, 2015, 10 pages.
Lamonica, M., "CES 2010 Preview: Green comes in many colors," retrieved from CNET.com (http://ces.cnet.com/8301-31045_1-10420381-269.html), Dec. 22, 2009, 2 pages.
Author Unknown, "Voice Activated TV using the Amulet Remote for Media Center," AmuletDevices.com, accessed on Jul. 14, 2014, 1 page. Retrieved from http://www.amuletdevices.com/index.php/Features/television.html.
Author Unknown, "App for Samsung Smart TV®," Crestron Electronics, Inc., accessed on Jul. 14, 2014, 3 pages. Retrieved from http://www.crestron.com/products/smart tv television apps/.
Author Unknown, "AllJoyn Onboarding Service Frameworks," Qualcomm Connected Experiences, Inc., accessed on Jul. 15, 2014, 9 pages. Retrieved from https://www.alljoyn.org.
Robbins, Gordon, Deputy Chief, "Addison Fire Department Access Control Installation," 2006 International Fire Code, Section 1008.1.3.4, 4 pages.
"International Building Code Excerpts, Updated with recent code changes that impact electromagnetic locks," Securitron, Assa Abloy, IBC/IFC 2007 Supplement and 2009, "Finally—some relief and clarification", 2 pages.Retrieved from: www.securitron.com/Other/.../New_IBC-IFC_Code_Language.pdf.
"Do you want to know how to find water leaks? Use a Bravedo Water Alert Flow Monitor to find out!", Bravedo.com, accessed Dec. 16, 2014, 10 pages. Retrieved from http://bravedo.com/.
"Flow Pulse®, Non-invasive clamp-on flow monitor for pipes," Pulsar Process Measurement Ltd, accessed on Dec. 16, 2014, 2 pages.Retrieved from http://www.pulsar-pm.com/product-types/flow/flow-pulse.aspx.
"Acoustic/Ultrasound Ultrasonic Flowmeter Basics," Questex Media Group LLC, accessed on Dec. 16, 2014, 4 pages. Retrieved from http://www.sensorsmag.corn/sensors/acoustic-ultrasound/ultrasonic-flowmeter-basics-842.
"Introduction to Ultrasonic Doppler Flowmeters," OMEGA Engineering inc., accessed on Dec. 16, 2014, 3 pages. Retrieved from http://www.omega.com/prodinfo/ultrasonicflowmeters.html.
"Ultrasonic Flow Meters," RS Hydro Ltd, accessed on Dec. 16, 2014, 3 pages. Retrieved from http://www.rshydro.co.uk/ultrasonic-flowmeter.shtml.
Wang et al., "Mixed Sound Event Verification on Wireless Sensor Network for Home Automation," IEEE Transactions on Industrial Informatics, vol. 10, No. 1, Feb. 2014, 10 pages.
Fong A.C.M. et al, "Indoor air quality control for asthma patients using smart home technology," Consumer Electronics (ISCE), 2011 IEEE 15th International Symposium on, IEEE, Jun. 14, 2011, pp. 18-19, XP032007803, DOI: 10.1109/ISCE.2011.5973774, ISBN: 978-1-61284-8433, Abstract and sections 3 and 4, 2 pages.
Shunfeng Cheng et al., "A Wireless Sensor System for Prognostics and Health Management," IEEE Sensors Journal, IEEE Service Center, New York, NY, US, vol. 10, No. 4, Apr. 1, 2010, pp. 856-862, XP011304455, ISSN: 1530-437X, Sections 2 and 3, 7 pages.
International Search Report and Written Opinion for PCT/EP2015/070286 dated Nov. 5, 2015, 13 pages.
International Search Report and Written Opinion for PCT/GB2015/052544 dated Nov. 6, 2015, 10 pages.
International Search Report and Written Opinion for PCT/GB2015/052457 dated Nov. 13, 2015, 11 pages.
International Search Report and Written Opinion for PCT/EP2015/073299 dated Jan. 4, 2016, 12 pages.
International Search Report and Written Opinion for PCT/EP2015/073936 dated Feb. 4, 2016, all pages.
U.S. Appl. No. 14/107,132, filed Dec. 16, 2013, Final Rejection dated Dec. 16, 2015, 32 pages.
U.S. Appl. No. 14/485,188, filed Sep. 12, 2014, Final Rejection dated Feb. 23, 2016, 22 pages.
U.S. Appl. No. 14/567,348, filed Dec. 11, 2014, Preinterview first office action dated Jan. 20, 2016, 23 pages.
U.S. Appl. No. 14/470,352, filed Aug. 27, 2014 Final Office Action dated Mar. 17, 2016, all pages.
U.S. Appl. No. 14/567,765, filed Dec. 11, 2014, Preinterview first office action dated Apr. 8, 2016, 30 pages.
U.S. Appl. No. 14/577,717, filed Dec. 19, 2014, Preinterview first office action dated Apr. 4, 2016, 29 pages.
U.S. Appl. No. 14/584,075, filed Dec. 29, 2014, Non-Final Rejection dated Apr. 1, 2016, 40 pages.
U.S. Appl. No. 14/470,352, filed Aug. 27, 2014 Non Final Office Action dated Aug. 26, 2016, all pages.
U.S. Appl. No. 14/107,132, filed Dec. 16, 2013, Non Final Office Action dated Jul. 18, 2016, all pages.
U.S. Appl. No. 14/715,248, filed May 18, 2015, Non-Final Rejection dated Jul. 19, 2016, 34 pages.
U.S. Appl. No. 14/567,783, filed Dec. 11, 2014, Non Final Rejection dated Aug. 23, 2016, all pages.
International Preliminary Report on Patentability for PCT/US2014/053876 dated Jun. 14, 2016, 7 pages.

(56) References Cited

OTHER PUBLICATIONS

International Preliminary Report on Patentability for PCT/US2014/055441 dated Jun. 14, 2016, 8 pages.
International Preliminary Report on Patentability for PCT/US2014/055476 dated Jun. 14, 2016, 9 pages.
U.S. Appl. No. 14/470,352, filed Aug. 27, 2014 Notice of Allowance dated Dec. 2, 2016, all pages.
U.S. Appl. No. 15/050,958, filed Feb. 23, 2016 Notice of Allowance dated Dec. 6, 2016, all pages.
U.S. Appl. No. 15/289,395, filed Oct. 10, 2016 Non-Final Rejection dated Dec. 2, 2016, all pages.
U.S. Appl. No. 14/485,188, filed Sep. 12, 2014, Final Rejection dated Nov. 25, 2016, 22 pages.
U.S. Appl. No. 14/577,717, filed Dec. 19, 2014, Final Office Action dated Dec. 19, 2016, all pages.
U.S. Appl. No. 14/567,783, filed Dec. 11, 2014, Final Rejection dated Dec. 20, 2016, all pages.
U.S. Appl. No. 15/075,412, filed Mar. 21, 2016, Non Final Rejection dated Dec. 21, 2016, all pages.
Mark Edward Soper, "Absolute Beginner's Guide to Home Automation," 2005, Que Publishing, p. 57, 121.
U.S. Appl. No. 14/982,366, filed Dec. 29, 2015, Non-Final Rejection dated Nov. 1, 2017, all pages.
U.S. Appl. No. 15/246,079, filed Aug. 24, 2016, Non-Final Rejection dated Oct. 19, 2017, all pages.
U.S. Appl. No. 14/485,188, filed Sep. 12, 2014, Final Rejection dated Oct. 25, 2017, all pages.
U.S. Appl. No. 14/485,038, filed Sep. 12, 2014, Notice of Allowance dated Nov. 13, 2017, all pages.
U.S. Appl. No. 14/528,402, filed Oct. 30, 2014, Final Rejection dated Oct. 31, 2017, all pages.
U.S. Appl. No. 14/981,501, filed Dec. 28, 2015, Final Office Action dated Oct. 10, 2017, all pages.
International Preliminary Report on Patentability for PCT/GB2015/052544 dated Mar. 7, 2017, all pages.
International Search Report and Written Opinion for PCT/US2016/057729 dated Mar. 28, 2017, all pages.
European Search Report for EP 16 20 0422 dated Jan. 13, 2017, all pages.
Bdejong_Cree, "Cannot remove last user of a group even though members still exist." Microsoft Visual Studio forum site, Topic ID #58405. Response by Microsoft, Dec. 17, 2010) retrieved on Apr. 6, 2017 from: https://connect.microsoft.com/VisualStudio/feedback/details/580405/tfs-2010-cannont-remove-last-user-of-a-group-even-though-members-still-exists.
International Preliminary Report on Patentability for PCT/GB2015/052457 dated Feb. 28, 2017, all pages.
U.S. Appl. No. 14/107,132, filed Dec. 16, 2013, Notice of Allowance dated Jan. 18, 2017, all pages.
U.S. Appl. No. 14/485,188, filed Sep. 12, 2014, Non-Final Rejection dated Apr. 19, 2017, all pages.
U.S. Appl. No. 14/567,765, filed Dec. 11, 2014, Final Rejection dated Feb. 16, 2017, all pages.
U.S. Appl. No. 14/485,038, filed Sep. 12, 2014, Non Final Rejection dated Apr. 6, 2017, all pages.
U.S. Appl. No. 14/584,075, filed Dec. 29, 2014, Non-Final Rejection dated Mar. 10, 2017, all pages.
U.S. Appl. No. 14/710,331, filed May 12, 2015, Non-Final Rejection dated Mar. 10, 2017, all pages.
U.S. Appl. No. 14/566,977, filed Dec. 11, 2014, Final Rejection dated Feb. 10, 2017, all pages.
U.S. Appl. No. 14/671,299, filed Mar. 27, 2015, Notice of Allowance dated Apr. 17, 2017, all pages.
U.S. Appl. No. 14/565,853, filed Dec. 10, 2014, Non Final Rejection dated Mar. 10, 2017, all pages.
U.S. Appl. No. 15/075,412, filed Mar. 21, 2016, Final Rejection dated Apr. 17, 2017, all pages.
U.S. Appl. No. 14/497,130, filed Sep. 25, 2014, Non Final Rejection dated Feb. 8, 2017, all pages.
U.S. Appl. No. 14/528,402, filed Oct. 30, 2014, Non-Final Rejection dated Apr. 11, 2017, all pages.
U.S. Appl. No. 14/475,252, filed Sep. 2, 2014, Non-Final Rejection dated Apr. 12, 2017, all pages.
U.S. Appl. No. 15/289,395, filed Oct. 10, 2016 Non-Final Rejection dated Jun. 19, 2017, all pages.
U.S. Appl. No. 14/497,130, filed Sep. 25, 2014, Final Rejection dated Aug. 4, 2017, all pages.
U.S. Appl. No. 14/981,501, filed Dec. 28, 2015, First Action Interview—office action dated Jul. 19, 2017, all pages.
U.S. Appl. No. 14/567,502, filed Dec. 11, 2014, Final Rejection dated Aug. 7, 2017, all pages.
U.S. Appl. No. 14/986,483, filed Dec. 31, 2015, Notice of Allowance dated May 3, 2018, all pages.
U.S. Appl. No. 14/986,496, filed Dec. 31, 2015, Notice of Allowance dated May 18, 2018, all pages.
U.S. Appl. No. 15/246,259, filed Aug. 24, 2016 Non-Final Rejection dated May 30, 2018, all pages.
U.S. Appl. No. 15/672,997, filed Aug. 9, 2017 Non-Final Office Action dated May 15, 2018, all pages.
U.S. Appl. No. 15/230,155, filed Aug. 5, 2016, Non-Final Office Action dated May 16, 2018, all pages.
Office Action CN Appln No. 201480067003.5 dated Jan. 19, 2018, all pages.
U.S. Appl. No. 14/952,580, filed Nov. 25, 2015, Notice of Allowance dated Feb. 12, 2018, all pages.
U.S. Appl. No. 14/710,331, filed May 12, 2015, Notice of Allowance dated Dec. 7, 2017, all pages.
U.S. Appl. No. 14/528,402, filed Oct. 30, 2014, Notice of Allowance dated Jan. 29, 2018, all pages.
U.S. Appl. No. 14/553,763, filed Nov. 25, 2014 Notice of Allowance dated Mar. 27, 2018, all pages.
U.S. Appl. No. 15/246,079, filed Aug. 24, 2016, Notice of Allowance dated Apr. 10, 2018, all pages.
International Preliminary Report on Patentability for PCT/US2016/057729 dated Jul. 3, 2018, all pages.
U.S. Appl. No. 14/982,366, filed Dec. 29, 2015, Final Rejection dated Jun. 1, 2018, all pages.
U.S. Appl. No. 14/985,151, filed Dec. 30, 2015 Non-Final Rejection dated Nov. 16, 2017, all pages.
U.S. Appl. No. 14/985,151, filed Dec. 30, 2015 Notice of Allowance dated Jun. 7, 2018, all pages.

* cited by examiner

HOME AUTOMATION DATA STORAGE SYSTEM AND METHODS

BACKGROUND

Home computer systems contain a great deal of important information for the computer owner. Individuals often keep a wealth of important and personal information on their home computer system. For example, individuals often store personal finance information and other confidential personal information on their home computer as well as photos and videos of important people and life events relating to the individual. Using current systems, many computer owners do not back up or secure the important and personal data stored on the home computer system. Failure to back up data can lead to data loss in the event of a computer failure, fire, or theft of the computer. Individuals that back up their data often back the data up to a backup storage facility, often called "cloud storage." Cloud storage, while convenient, can create potential security issues, which can allow the individual's data to be compromised by unscrupulous data hackers. Additionally, the data stored on a computer system, such as a home laptop, is unsecured on the laptop, and is lost and potentially compromised if the laptop is stolen.

BRIEF SUMMARY OF THE INVENTION

In some embodiments, a system may be provided including a plurality of home automation components, each component from the plurality of home automation components including a storage device. The system may include a controller database for storing control data for the home automation system. The system may include an electronic device communicatively coupled to each component from the plurality of home automation components and to a computing device and to the controller database. The electronic device may include one or more processors and a memory coupled with and readable by the one or more processors and having stored therein a sequence of instructions which, when executed by the one or more processors, cause the one or more processors to receive data from the computing device; store at least a portion of the data in the storage device of a component from the plurality of home automation components; and store information associating the storage device of the component and the at least a portion of the data in the controller database.

Embodiments of such a system may include one or more of the following features: wherein the data includes a data file, and wherein the sequence of instructions that cause the one or more processors to store at least a portion of the data to the storage device of a component from the plurality of home automation components includes instructions that cause the one or more processors to split the data file into a plurality of data segments. Embodiments may also include storing a first data segment from the plurality of data segments to the storage device of a first component from the plurality of home automation components, and storing a second data segment from the plurality of data segments to the storage device of a second component from the plurality of home automation components.

The memory may further have stored therein processor-readable instructions which, when executed by the one or more processors, cause the one or more processors to: store information associating the first data segment with the storage device of the first component in the controller database, and store information associating the second data segment with the storage device of the second component in the controller database.

Embodiments of such a system may further include wherein the storage device of the component from the plurality of home automation components is a removable memory card. The system may further include wherein the storage device of the component from the plurality of home automation components is not removable. The system may further include wherein the computing device does not maintain a copy of the data at the computing device. The system may further include wherein the component from the plurality of home automation components is selected from the group consisting of light bulb, light switch, motion sensor, door sensor, and smoke detector. The system may further include wherein the electronic device is a home automation controller, the data is one digital data file, and the entire digital data file is stored on the storage device of the home automation component.

Embodiments of such a system may further include wherein the component from the plurality of home automation components is removed from the plurality of home automation components. The memory further may have stored therein processor-readable instructions which, when executed by the one or more processors, cause the one or more processors to: determine that the component from the plurality of home automation components was removed; identify the portion of the data stored on the storage device of the component; and rebuild the at least a portion of the data on a storage device of a different component from the plurality of home automation components.

The memory further may have stored therein processor-readable instructions which, when executed by the one or more processors, cause the one or more processors to: receive a request for the data from the computing device; determine, using information stored in the controller database, that the data includes the first data segment and the second data segment. There may be further instructions that determine, using information stored in the controller database, that the first data segment is stored on the storage device of the first component and the second data segment is stored on the storage device of the second component. There may be further instructions that retrieve the first data segment from the storage device of the first component. There may be further instructions that retrieve the second data segment from the storage device of the second component. There may be further instructions that combine the first data segment and the second data segment to regenerate the data. There may be further instructions that send the data to the computing device.

In some embodiments, a method may be provided including receiving a data file at a home automation controller from a computing device communicatively coupled to the home automation controller. The method may also include storing, by the home automation controller, at least a portion of the data file to a storage device of a home automation component from a plurality of home automation components, the plurality of home automation components being communicatively coupled to the home automation controller. The method may further include storing, by the home automation controller in a controller database, information associating the at least a portion of the data file and the storage device of the component.

Embodiments of such a method may include one or more of the following features: splitting, by the home automation controller, the data file into a plurality of data segments. The method may further include storing, by the home automation controller, a first data segment from the plurality of data segments to the storage device of a first home automation component from the plurality of home automation components. The method may further include storing, by the home automation controller, a second data segment from the plurality of data segments to the storage device of a second component from the plurality of home automation components.

The method may further include storing, by the home automation controller, information associating the first data segment with the storage device of the first component in the controller database. The method may further include storing, by the home automation controller, information associating the second data segment with the storage device of the second component in the controller database.

The method may further include wherein the storage device of the component from the plurality of home automation components is a removable memory card. The method may further include wherein the storage device of the component from the plurality of home automation components is not removable. The method may further include wherein the computing device does not maintain a copy of the data at the computing device.

The method may further include wherein the component from the plurality of home automation components is selected from the group consisting of light bulb, light switch, motion sensor, door sensor, and smoke detector. The method may further include wherein the data file is one digital data file, and the entire digital data file is stored on the storage device of the home automation component.

The method may further include wherein the component from the plurality of home automation components is removed from the plurality of home automation components, and wherein the method further includes determining, by the home automation controller, that the component from the plurality of home automation components was removed. The method may further include identifying, by the home automation controller, the at least a portion of the data file stored on the storage device of the component. The method may further include rebuilding, by the home automation controller, the at least a portion of the data file on the storage device of a different component from the plurality of home automation components.

The method may further include receiving, by the home automation controller, a request for the data file from the computing device. The method may further include retrieving, by the home automation controller, the first data segment from the storage device of the first component. The method may further include retrieving, by the home automation controller, the second data segment from the storage device of the second component. The method may further include combining, by the home automation controller, the first data segment and the second data segment to regenerate the data file. The method may further include sending the data file to the computing device.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ability to store data from a home computing device utilizing a home automation system can be useful to an individual. While many current home computing systems have local storage space, the amount of space and security of the data it holds can be questionable. Having a secure location to store or back up data in a home environment can be useful.

Embodiments detailed herein present a home automation data storage system that can utilize a home automation system that may or may not have been previously installed in a home. The system can store or back-up data from a home computing device. The system can utilize the storage space available on home automation components. Home automation components (e.g., motion sensors, glass breakage sensors, door bells, garage door openers, security cameras, light bulbs, light switches, contact sensors, power outlets, smoke detectors, carbon monoxide detectors, etc.) generally have some amount of persistent storage (e.g., non-volatile storage) within the component. In some cases, the components have only a very small amount of storage space (e.g., 8 kB) and in other cases, the components have a larger amount of storage space (e.g., 1 GB). The methods and systems described herein can utilize the existing storage capacity of home automation components or, in some embodiments, can utilize removable storage that expands a component's storage capacity (e.g., CompactFlash card, Secure Digital card, memory stick, etc.), or, in some embodiments, can use components that are designed to include larger storage devices within the component.

Figure 1:
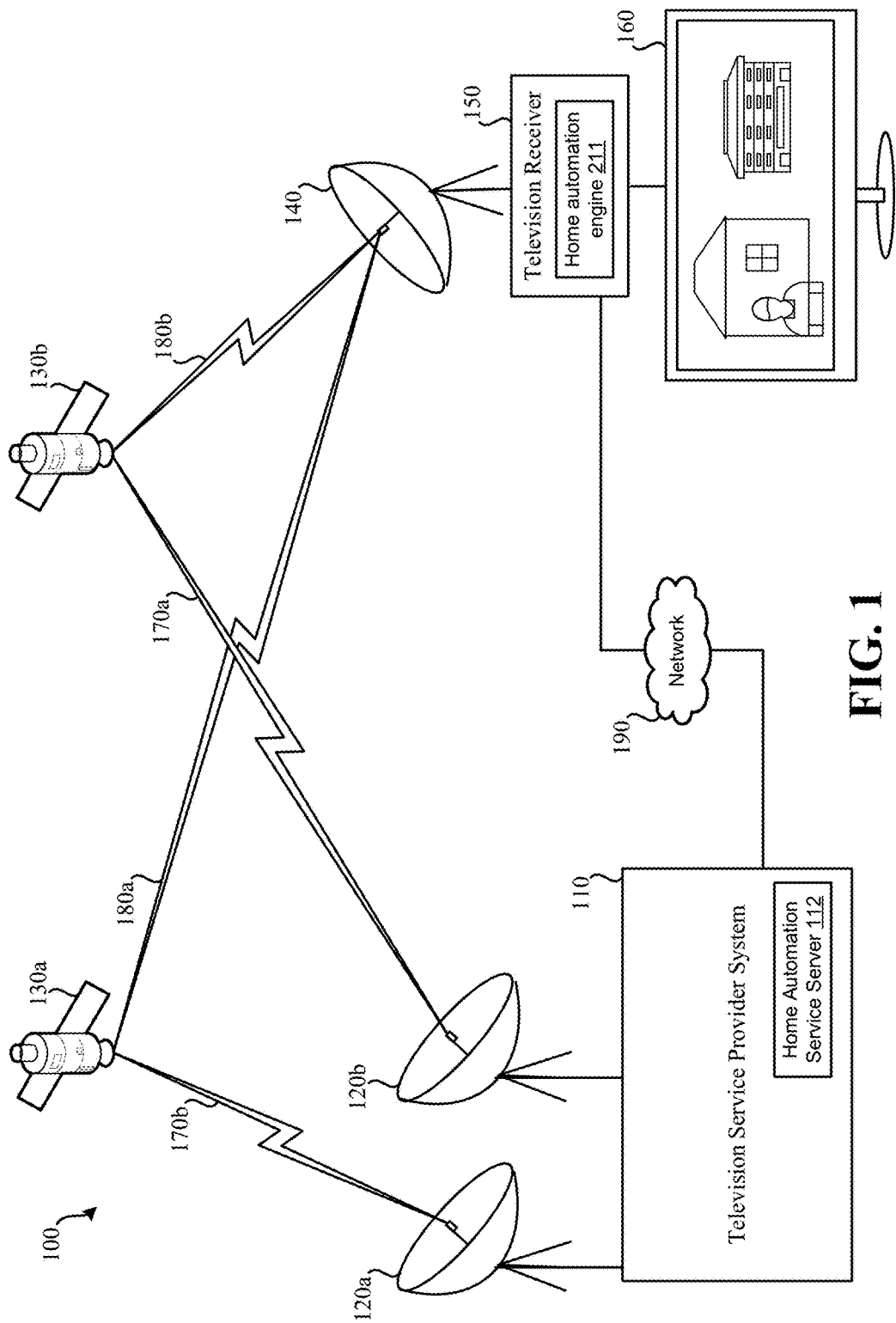
FIG. 1 illustrates an embodiment of a television service provider system that provides home automation functionality.

FIG. 1 illustrates an embodiment of a satellite television distribution system 100. While a home automation system may be incorporated with various types of television receivers, various embodiments may be part of a satellite-based television distribution system. Cable, IP-based, wireless, and broadcast focused systems are also possible. Satellite television distribution system 100 may include: television service provider system 110, satellite transmitter equipment 120, satellites 130, satellite dish 140, television receiver 150, home automation service server 112, and display device 160. The display device 160 can be controlled by, for example, a user using a remote control device that can send wired or wireless signals to communicate with the television receiver 150 and/or display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions of) instances and types of user equipment may receive data and television signals from television service provider system 110 via satellites 130.

Television service provider system 110 and satellite transmitter equipment 120 may be operated by a television service provider. A television service provider may distribute television channels, on-demand programming, programming information, and/or other content/services to users. Television service provider system 110 may receive feeds of one or more television channels and content from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from downlink signals 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed. Further, information used by television receiver 150 for home automation functions may also be relayed to a television receiver via one or more transponder streams.

Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 130*a*. A third, fourth, and fifth television channel may be relayed via a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

Figure 2:
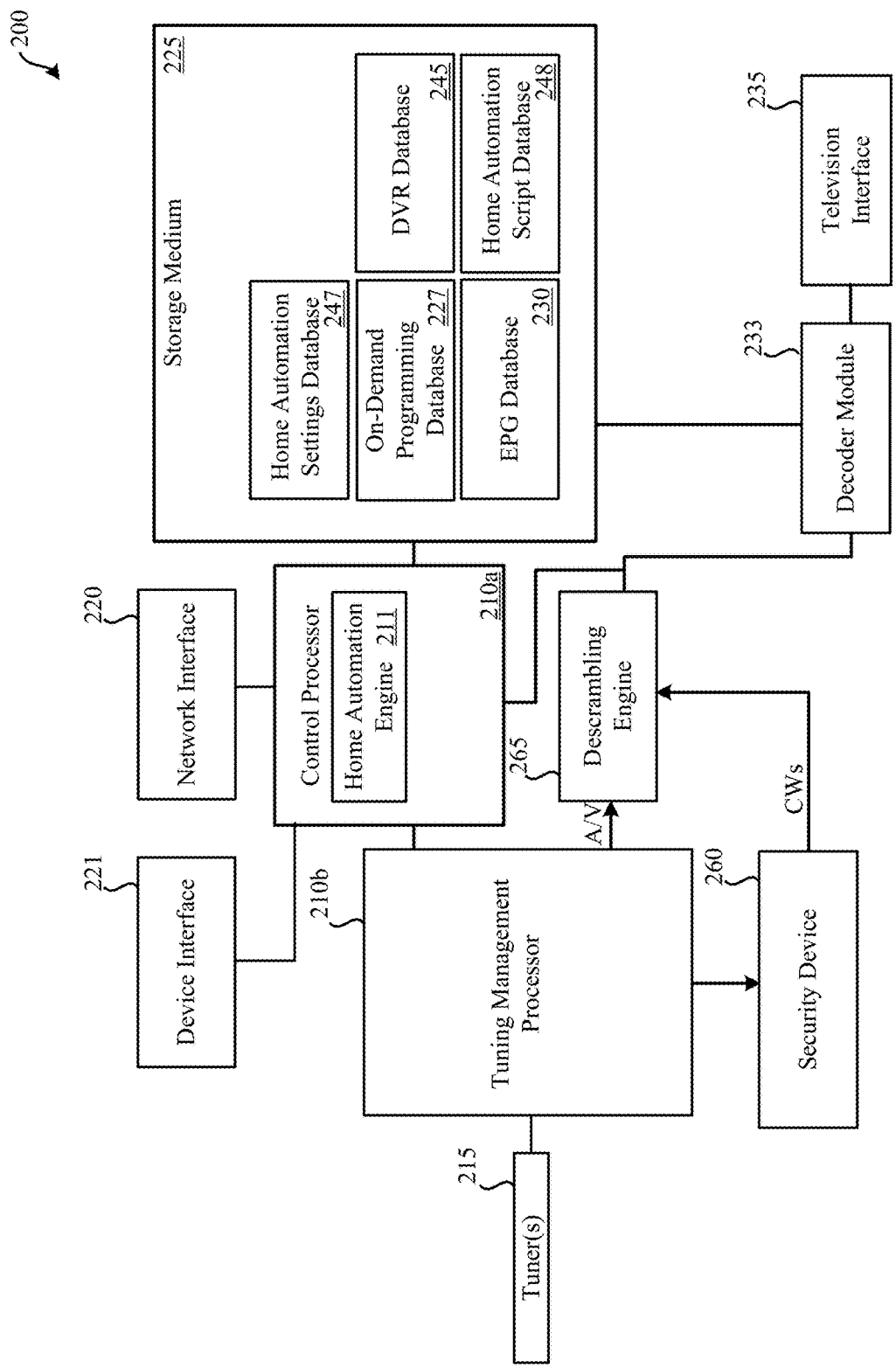
FIG. 2 illustrates an embodiment of a television receiver that functions as a host for a home automation system.

In communication with satellite dish 140 may be one or more television receivers. Television receivers may be configured to decode signals received from satellites 130 via satellite dish 140 for output and presentation via a display device, such as display device 160. A television receiver may be incorporated as part of a television or may be part of a separate device, commonly referred to as a set-top box (STB). Television receiver 150 may decode signals received via satellite dish 140 and provide an output to display device 160. On-demand content, such as PPV content, may be stored to a computer-readable storage medium. FIG. 2 provides additional detail of various embodiments of a television receiver. A television receiver is defined to include set-top boxes (STBs), and also circuitry having similar functionality that may be incorporated with another device. For instance, circuitry similar to that of a television receiver may be incorporated as part of a television. As such, while FIG. 1 illustrates an embodiment of television receiver 150 as separate from display device 160, it should be understood that, in other embodiments, similar functions may be performed by a television receiver integrated with display device 160. Television receiver 150 may include home automation engine 211, as detailed in relation to FIG. 2.

Display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

Uplink signal 170*a* represents a signal between satellite transmitter equipment 120 and satellite 130*a*. Uplink signal 170*b* represents a signal between satellite transmitter equipment 120 and satellite 130*b*. Each of uplink signals 170 may contain streams of one or more different television channels. For example, uplink signal 170*a* may contain a first group of television channels, while uplink signal 170*b* contains a second group of television channels. Each of these television channels may be scrambled such that unauthorized persons are prevented from accessing the television channels.

Downlink signal 180a represents a signal between satellite 130a and satellite dish 140. Downlink signal 180b represents a signal between satellite 130b and satellite dish 140. Each of downlink signals 180 may contain one or more different television channels, which may be at least partially scrambled. A downlink signal 180 may be in the form of a transponder stream. A single transponder stream may be tuned to at a given time by a tuner of a television receiver. For example, downlink signal 180a may be a first transponder stream containing a first group of television channels, while downlink signal 180b may be a second transponder stream containing a different group of television channels. In addition to or instead of containing television channels, a transponder stream can be used to transmit on-demand content to television receivers, including PPV content, which may be stored locally by the television receiver until output for presentation.

FIG. 1 illustrates downlink signal 180a and downlink signal 180b, being received by satellite dish 140 and distributed to television receiver 150. For a first group of television channels, satellite dish 140 may receive downlink signal 180a and for a second group of channels, downlink signal 180b may be received. Television receiver 150 may decode the received transponder streams. As such, depending on which television channels are desired to be presented or stored, various transponder streams from various satellites may be received, descrambled, and decoded by television receiver 150.

Network 190, which may include the Internet, may allow for bidirectional communication between television receiver 150 and television service provider system 110, such as for home automation related services provided by home automation service server 112. Although illustrated as part of the television service provider system, the home automation service server 112 may be provided by a third party in embodiments. In addition or in alternate to network 190, a telephone, e.g., landline, or cellular connection may be used to enable communication between television receiver 150 and television service provider system 110.

FIG. 2 illustrates an embodiment of a television receiver 200, which may represent television receiver 150 of FIG. 1. Television receiver 200 may be configured to function as a host for a home automation system either alone or in conjunction with a communication device. Television receiver 200 may be in the form of a separate device configured to be connected with a display device, such as a television. Embodiments of television receiver 200 can include set top boxes (STBs). In addition to being in the form of an STB, a television receiver may be incorporated as part of another device, such as a television, other form of display device, video game console, computer, mobile phone or tablet, or the like. For example, a television may have an integrated television receiver, which does not involve an external STB being coupled with the television.

Television receiver 200 may be incorporated as part of a television, such as display device 160 of FIG. 1. Television receiver 200 may include: processors 210, which may include control processor 210a, tuning management processor 210b, and possibly additional processors, tuners 215, network interface 220, non-transitory computer-readable storage medium 225, electronic programming guide (EPG) database 230, television interface 235, digital video recorder (DVR) database 245, which may include provider-managed television programming storage and/or user-defined television programming, on-demand programming database 227, home automation settings database 247, home automation script database 248, remote control interface 250, security device 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210b. Further, functionality of components may be spread among additional components.

Processors 210 may include one or more specialized and/or general-purpose processors configured to perform processes such as tuning to a particular channel, accessing and displaying EPG information from EPG database 230, and/or receiving and processing input from a user. It should be understood that the functions performed by various modules of FIG. 2 may be performed using one or more processors. As such, for example, functions of descrambling engine 265 may be performed by control processor 210a.

Control processor 210a may communicate with tuning management processor 210b. Control processor 210a may control the recording of television channels based on timers stored in DVR database 245. Control processor 210a may also provide commands to tuning management processor 210b when recording of a television channel is to cease. In addition to providing commands relating to the recording of television channels, control processor 210a may provide commands to tuning management processor 210b that indicate television channels to be output to decoder module 233 for output to a display device. Control processor 210a may also communicate with network interface 220 and remote control interface 250. Control processor 210a may handle incoming data from network interface 220 and remote control interface 250. Additionally, control processor 210a may be configured to output data via network interface 220.

Control processor 210a may include home automation engine 211. Home automation engine 211 may permit television receiver and control processor 210a to provide home automation functionality. Home automation engine 211 may have a JSON (JavaScript Object Notation) command interpreter or some other form of command interpreter that is configured to communicate with wireless devices via network interface 220 and a message server, possibly via a message server client. Such a command interpreter of home automation engine 211 may also communicate via a local area network with devices without using the Internet. Home automation engine 211 may contain multiple controllers specific to different protocols; for instance, a ZigBee® controller, a Z-Wave® controller, and/or an IP camera controller, wireless LAN, 802.11, may be present. Home automation engine 211 may contain a media server configured to serve streaming audio and/or video to remote devices on a local area network or the Internet. Television receiver may be able to serve such devices with recorded content, live content, and/or content recorded using one or more home automation devices, such as cameras.

Tuners 215 may include one or more tuners used to tune to transponders that include broadcasts of one or more television channels. Such tuners may be used also to receive for storage on-demand content and/or addressable television commercials. In some embodiments, two, three, or more than three tuners may be present, such as four, six, or eight tuners. Each tuner contained in tuners 215 may be capable of receiving and processing a single transponder stream from a satellite transponder or from a cable network at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210*b*. Such commands may instruct tuners 215 to which frequencies are to be tuned.

Network interface 220 may be used to communicate via an alternate communication channel with a television service provider, if such communication channel is available. A communication channel may be via satellite, which may be unidirectional to television receiver 200, and the alternate communication channel, which may be bidirectional, may be via a network, such as the Internet. Data may be transmitted from television receiver 200 to a television service provider system and from the television service provider system to television receiver 200. Information may be transmitted and/or received via network interface 220. For instance, instructions from a television service provider may also be received via network interface 220, if connected with the Internet. Besides the primary communication channel being satellite, cable network, an IP-based network, or broadcast network may be used. Network interface 220 may permit wireless communication with one or more types of networks, including using home automation network protocols and wireless network protocols. Also, wired networks may be connected to and communicated with via network interface 220. Device interface 221 may represent a USB port or some other form of communication port that permits communication with a communication device as will be explained further below.

Storage medium 225 may represent one or more non-transitory computer-readable storage mediums. Storage medium 225 may include memory and/or a hard drive. Storage medium 225 may be used to store information received from one or more satellites and/or information received via network interface 220. Storage medium 225 may store information related to on-demand programming database 227, EPG database 230, DVR database 245, home automation settings database 247, and/or home automation script database 248. Recorded television programs may be stored using storage medium 225 as part of DVR database 245. Storage medium 225 may be partitioned or otherwise divided, such as into folders, such that predefined amounts of storage medium 225 are devoted to storage of television programs recorded due to user-defined timers and stored television programs recorded due to provider-defined timers.

Home automation settings database 247 may allow configuration settings of home automation devices and user preferences to be stored. Home automation settings database 247 may store data related to various devices that have been set up to communicate with television receiver 200. For instance, home automation settings database 247 may be configured to store information on which types of events should be indicated to users, to which users, in what order, and what communication methods should be used. For instance, an event such as an open garage may only be notified to certain wireless devices, e.g., a cellular phone associated with a parent, not a child, notification may be by a third-party notification server, email, text message, and/or phone call. In some embodiments, a second notification method may only be used if a first fails. For instance, if a notification cannot be sent to the user via a third-party notification server, an email may be sent.

Home automation settings database 247 may store information that allows for the configuration and control of individual home automation devices which may operate using Z-wave® and ZigBee®—specific protocols. To do so, home automation engine 211 may create a proxy for each device that allows for settings for the device to be passed through a UI, e.g., presented on a television, to allow for settings to be solicited for and collected via a user interface presented by television receiver or overlay device. The received settings may then be handled by the proxy specific to the protocol, allowing for the settings to be passed on to the appropriate device. Such an arrangement may allow for settings to be collected and received via a UI of the television receiver or overlay device and passed to the appropriate home automation device and/or used for managing the appropriate home automation device. For example, a piece of exercise equipment that is enabled to interface with the home automation engine 211, such as via device interface 221, may be configured at the electronic device 211 in addition to on the piece of exercise equipment itself. Additionally, a mobile device or application residing on a mobile device and utilized with exercise equipment may be configured in such a fashion as well for displaying received fitness information on a coupled display device.

Home automation script database 248 may store scripts that detail how home automation devices are to function based on various events occurring. For instance, if stored content starts being played back by television receiver 200, lights in the vicinity of display device 160 may be dimmed and shades may be lowered by communicatively coupled and controlled shade controller. As another example, when a user shuts programming off late in the evening, there may be an assumption the user is going to bed. Therefore, the user may configure television receiver 200 to lock all doors via a lock controller, shut the garage door via garage controller, lower a heat setting of thermostat, shut off all lights via a light controller, and determine if any windows or doors are open via window sensors and door sensors, and, if so, alert the user. Such scripts or programs may be predefined by the home automation/television service provider and/or may be defined by a user.

In some embodiments, home automation script database 248 may allow for various music profiles to be implemented. For instance, based on home automation settings within a structure, appropriate music may be played. For instance, when a piece of exercise equipment is connected or is used, energizing music may be played. Conversely, based on the music being played, settings of home automation devices may be determined. If television programming, such as a movie, is output for playback by television receiver 150, a particular home automation script may be used to adjust home automation settings, e.g., lower lights, raise temperature, and lock doors.

EPG database 230 may store information related to television channels and the timing of programs appearing on such television channels. EPG database 230 may be stored using storage medium 225, which may be a hard drive or solid-state drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220, via satellite, or some other communication link with a television service provider, e.g., a cable network. Updates to EPG database 230 may be received periodically. EPG database 230 may serve as an interface for a user to control DVR functions of television receiver 200, and/or to enable viewing and/or recording of multiple television channels simultaneously. EPG database 240 may also contain information about on-demand content or any other form of accessible content.

Decoder module 233 may serve to convert encoded video and audio into a format suitable for output to a display device. For instance, decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265, simultaneously. For instance, decoders within decoder module 233 may be able to only decode a single television channel at a time. Decoder module 233 may have various numbers of decoders.

Television interface 235 may serve to output a signal to a television or another form of display device in a proper format for display of video and playback of audio. As such, television interface 235 may output one or more television channels, stored television programming from storage medium 225, e.g., television programs from DVR database 245, television programs from on-demand programming 230 and/or information from EPG database 230, to a television for presentation. Television interface 235 may also serve to output a CVM.

Digital Video Recorder (DVR) functionality may permit a television channel to be recorded for a period of time. DVR functionality of television receiver 200 may be managed by control processor 210a. Control processor 210a may coordinate the television channel, start time, and stop time of when recording of a television channel is to occur. DVR database 245 may store information related to the recording of television channels. DVR database 245 may store timers that are used by control processor 210a to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created; one for each television channel. Within each file, one or more television programs may be present. The service provider may define the television channels, the dates, and the time periods for which the television channels are recorded for the provider-defined timers. The provider-defined timers may be transmitted to television receiver 200 via the television provider's network. For example, in a satellite-based television service provider system, data necessary to create the provider-defined timers at television receiver 150 may be received via satellite.

On-demand programming database 227 may store additional television programming. On-demand programming database 227 may include television programming that was not recorded to storage medium 225 via a timer, either user- or provider-defined. Rather, on-demand programming may be programming provided to the television receiver directly for storage by the television receiver and for later presentation to one or more users. On-demand programming may not be user-selected. As such, the television programming stored to on-demand programming database 227 may be the same for each television receiver of a television service provider. On-demand programming database 227 may include pay-per-view (PPV) programming that a user must pay and/or use an amount of credits to view. For instance, on-demand programming database 227 may include movies that are not available for purchase or rental yet.

Referring back to tuners 215, television channels received via satellite or cable may contain at least some scrambled data. Packets of audio and video may be scrambled to prevent unauthorized users, e.g., nonsubscribers, from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which can be determined to be associated with a particular television channel. Particular data packets, referred to as entitlement control messages (ECMs), may be periodically transmitted. ECMs may be associated with another PID and may be encrypted; television receiver 200 may use decryption engine 261 of security device 260 to decrypt ECMs. Decryption of an ECM may only be possible if the user has authorization to access the particular television channel associated with the ECM. When an ECM is determined to correspond to a television channel being stored and/or displayed, the ECM may be provided to security device 260 for decryption.

When security device 260 receives an encrypted ECM, security device 260 may decrypt the ECM to obtain some number of control words. In some embodiments, from each ECM received by security device 260, two control words are obtained. In some embodiments, when security device 260 receives an ECM, it compares the ECM to the previously received ECM. If the two ECMs match, the second ECM is not decrypted because the same control words would be obtained. In other embodiments, each ECM received by security device 260 is decrypted; however, if a second ECM matches a first ECM, the outputted control words will match; thus, effectively, the second ECM does not affect the control words output by security device 260. Security device 260 may be permanently part of television receiver 200 or may be configured to be inserted and removed from television receiver 200, such as a smart card, cable card, or the like.

Tuning management processor 210b may be in communication with tuners 215 and control processor 210a. Tuning management processor 210b may be configured to receive commands from control processor 210a. Such commands may indicate when to start/stop receiving and/or recording of a television channel and/or when to start/stop causing a television channel to be output to a television. Tuning management processor 210b may control tuners 215. Tuning management processor 210b may provide commands to tuners 215 that instruct the tuners which satellite, transponder, and/or frequency to tune to. From tuners 215, tuning management processor 210b may receive transponder streams of packetized data.

Descrambling engine 265 may use the control words output by security device 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by security device 260 to be used for successful descrambling may be indicated by a scramble control identifier present within the data packet containing the scrambled video or audio. Descrambled video and/or audio may be output by descrambling engine 265 to storage medium 225 for storage, in DVR database 245, and/or to decoder module 233 for output to a television or other presentation equipment via television interface 235.

In some embodiments, the television receiver 200 may be configured to periodically reboot in order to install software updates downloaded over the network 190 or satellites 130. Such reboots may occur for example during the night when the users are likely asleep and not watching television. If the system utilizes a single processing module to provide television receiving and home automation functionality, then the security functions may be temporarily deactivated. In order to increase the security of the system, the television receiver 200 may be configured to reboot at random times during the night in order to allow for installation of updates. Thus, an intruder is less likely to guess the time when the system is rebooting. In some embodiments, the television receiver 200 may include multiple processing modules for providing different functionality, such as television receiving functionality and home automation, such that an update to one module does not necessitate reboot of the whole system. In other embodiments, multiple processing modules may be made available as a primary and a backup during any installation or update procedures.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components, such as disclosed in relation to computer system 900 of FIG. 9.

While the television receiver 200 has been illustrated as a satellite-based television receiver, it is to be appreciated that techniques below may be implemented in other types of television receiving devices, such a cable receivers, terrestrial receivers, IPTV receivers or the like. In some embodiments, the television receiver 200 may be configured as a hybrid receiving device, capable of receiving content from disparate communication networks, such as satellite and terrestrial television broadcasts. In some embodiments, the tuners may be in the form of network interfaces capable of receiving content from designated network locations. The home automation functions of television receiver 200 may be performed by an overlay device. If such an overlay device is used, television programming functions may still be provided by a television receiver that is not used to provide home automation functions.

Figure 3:
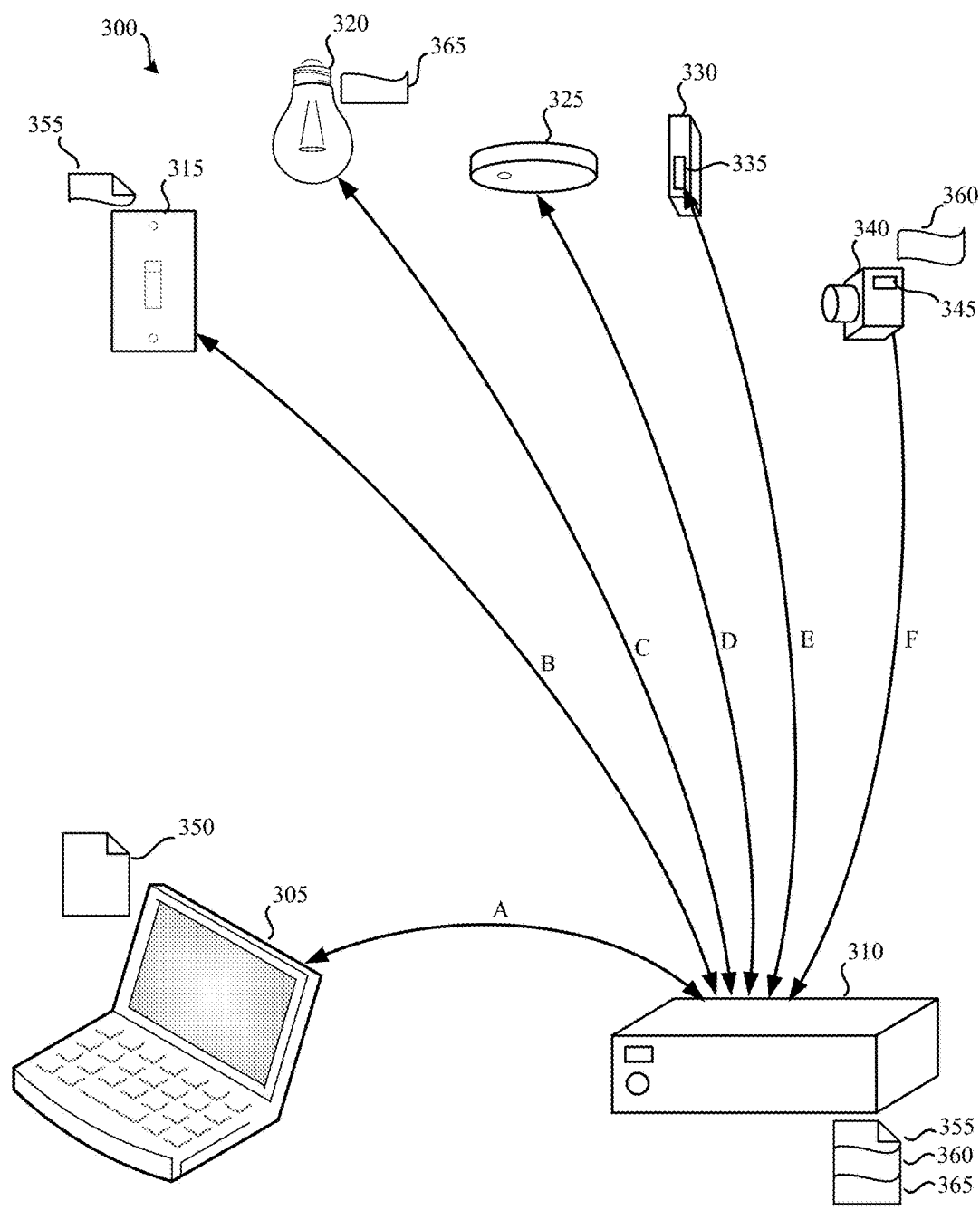
FIG. 3 illustrates an embodiment of a home automation data storage system.

FIG. 3 illustrates an embodiment of a home automation data storage system 300. The home automation data storage system 300 can be incorporated as part of satellite television distribution system 100 of FIG. 1. Home automation data storage system 300 can include a computing device 305, a home automation controller 310, data file 350, data segments 355, 36, and 365, and home automation components including light switch 315, light bulb 320, smoke detector 325, door sensor 330, and security camera 340.

Computing device 305 can be any home computing device such as, for example, a desktop computer, a laptop computer, a tablet, a smartphone, or any other suitable computing device. The computing device 305 can be, for example, computer system 900 as described with respect to FIG. 9 below. In some embodiments, computing device 305 can include a storage device (e.g., storage device 925). In other embodiments, computing device 305 may not contain a storage device and instead can utilize the home automation data storage system 300 for storage of all persistent data. A homeowner or individual with access to home automation data storage system 300 can utilize computing device 305 for any computing functionality including, but not limited to, word processing, data manipulation and storage, gaming, and internet access.

Home automation controller 310 can be, for example, television receiver 150 as described with respect to FIG. 1 or television receiver 200 as described with respect to FIG. 2. Home automation controller 310 can be communicatively coupled to computing device 305 as shown by the communication line A. Home automation controller 310 can be coupled to computing device 305 through a wired connection and/or through a wireless connection using, for example, Bluetooth®, ZigBee®, any of the IEEE 802.11 family of wireless protocols, or any other wireless protocol.

In some home automation systems there is a dedicated controller for controlling the home automation system, such as home automation controller 310, and a separate computing device 305 as depicted in FIG. 3. In some embodiments, the home automation controller 310 can be incorporated with the computing device 305. In such embodiments, the computing device 305 can be the host controller for the home automation system as well as a computing device for use by the homeowner or administrator of the home automation system.

Home automation data storage system 300 can include any number of home automation components. In some embodiments, home automation data storage system 300 can include light switch 315, light bulb 320, smoke detector 325, door sensor 330, and security camera 340. In some embodiments home automation data storage system 300 can include one or more of each component. For example, home automation data storage system can include twenty-five (25) light switches 315. Additional components can be included that are not depicted in FIG. 3. For example, other home automation components can include garage door sensors, carbon monoxide detectors, contact sensors, motion sensors, power outlets, garage door openers, glass breakage sensors, door bells, and any other suitable component for use in a home automation system.

Each home automation component (315, 320, 325, 330, 340) can be communicatively coupled to home automation controller 310. The home automation components can be coupled through a wired connection or through a wireless connection similar to computing device 305. The computing device 305 can communicate with home automation controller 310 using a different and/or the same communication protocol than each home automation component (315, 320, 325, 330, 340). For example, communication line A can be a wired connection utilizing TCP/IP, while communication line B can be Bluetooth, communication line C can be ZigBee, communication line D can be ZWave, communication line E can be Bluetooth, and communication line F can be a wired connection using TCP/IP. Light switch 315 can be coupled to home automation controller 310 as shown by the communication line B in FIG. 3. Similarly light bulb 320, smoke detector 325, door sensor 330, and security camera 340 can be coupled to home automation controller 310 as shown by the communication lines labelled C, D, E, and F in FIG. 3.

Each home automation component (315, 320, 325, 330, 340) can include a storage device. The storage device in each component can be a different size than the storage device in other components. For example, light switch 315 can include a storage device with a capacity of 100 kB and door sensor 330 can include a storage device with a capacity of 1 MB. In some embodiments, the home automation components can include a non-removable storage device that can be, for example, internally located in the component. In some embodiments, the home automation components can include a removable storage device, such as, for example, a secure digital memory card ("SD card"). As shown in FIG. 3, door sensor 330 can include a removable storage device 335, which can be, for example, an SD card. Similarly, security camera 340 can include removable storage device 345. Each of the other home automation components 315, 320, and 325 can also include a non-removable and/or a removable storage device.

In some embodiments, the storage devices located on each home automation component 315, 320, 325, 330, 340 can be configured individually to store the data designated by the home automation controller 310. In some embodiments, some or all of the storage devices located on the home automation components 315, 320, 325, 330, 340 can be configured into a Redundant Array of Independent Disk ("RAID")-type configuration. RAID arrays can be configured in several different ways including allowing for fault tolerance. The storage devices in the home automation components 315, 320, 325, 330, 340 can be configured to provide fault tolerance in the event that a home automation component 315, 320, 325, 330, 340 fails, which could otherwise result in loss of data. An example of this type of fault tolerance is RAID 5. In some embodiments, the storage device associated with any given home automation component 315, 320, 325, 330, 340 can be utilized as a single storage location or can be partitioned to provide several smaller storage locations. Additionally, the storage devices can be grouped into arrays of devices that optimize performance and utilization of disk space. Within a single home automation data storage system, the multiple storage devices can be configured into multiple arrays for providing fault tolerance and speed optimization of data. In a typical RAID array the drives are all identical high performance drives. The configuration in a home automation data storage system can be different than a standard RAID array in that the storage devices may not be large, identical, or high performance. In some embodiments, the home automation components 315, 320, 325, 330, 340 can be communicatively coupled with other home automation components 315, 320, 325, 330, 340. The home automation components 315, 320, 325, 330, 340 can be communicatively coupled with the home automation controller 310. The home automation controller 310 can control and configure the storage devices on each home automation component (315, 320, 325, 330, 340).

Data file 350 can be any data file used or generated on computing device 305. For example, data file 350 can be a word processing document (e.g., test.doc), an image file (e.g., image.jpg or image.gif), a video file (e.g., video.mp4), or any other file used on computing device 305. Data file 350 can be a single file or multiple files. Data file 350 can be encrypted at computing device 305, at home automation controller 310, or not at all. In some embodiments, data file 350 can be split into data segments 355, 360, and 365. Data segments can be equal sized segments of data file 350 or unequal sized segments. For example, if data file 350 is a 15 kB file, data segment 355 can include 5 kB of data from data file 350. Similarly, data segments 360 and 365 can also each include 5 kB of data from data file 350. Data segments 355, 360, and 365 can also include header file information or other overhead data necessary for identifying the data segment. In some embodiments, the data segments can be differing sized segments. For example, if data file 350 is a 15 kB file, data segment 355 can include 3 kB of data from data file 350, data segment 360 can include 10 kB of data from data file 350, and data segment 365 can include 2 kB of data from data file 350. The size of the data segment can depend on, for example, the number of segments the home automation controller 310 splits data file 350 into. While shown split into 3 data segments in FIG. 3, data file 350 can be split into any number of data segments. The size of the data segments can also depend on, for example, the amount of available memory in the home automation component that will store the data segment. In some embodiments, the data segments 355, 360, and 365 can be encrypted after being split into segments.

Home automation data storage system 300 can be used to store data from computing device 305. Computing device 305 can include a storage device and use the home automation data storage system 300 as backup storage or, in some embodiments, computing device 305 can use the home automation data storage system 300 as its primary storage device. When the home automation data storage system 300 is used as the primary storage for computing device 305, the theft or loss of computing device 305 need not result in the theft or loss of the data stored on the home automation data storage system 300. In some embodiments, the computing device 305 can include a storage device, yet still use the home automation data storage system 300 as its primary storage device.

In use, a user can develop data file 350. Once the data file 350 is to be saved (or backed up), computing device 305 can transmit the data file 350 over communication link A to home automation controller 310. The home automation controller 310 can split the data file 310 into one or more data segments 355, 360, and 365. In some embodiments, a data file 350 can be stored on a storage device without being split into data segments. In such embodiments, the data file 350 is stored as a single file on a storage device of a home automation component.

Once the data file 350 is split into data segments 355, 360, and 365, the data segments can be transmitted over communication links to the storage device associated with a home automation component. For example, as shown in FIG. 3, data segment 355 can be transmitted over communication link B to light switch 315 for storage on its storage device. Similarly, data segment 360 can be transmitted over communication link F to storage device 345 of security camera 340 and data segment 365 can be transmitted over communication link C to the storage device (not depicted) on light bulb 320.

Additionally, as noted by the bi-directional arrows in FIG. 3, the data segments 355, 360, and 365 can be retrieved by home automation controller 310, recombined into data file 350, and transmitted back to computing device 305.

In some embodiments, security can be a function of the home automation data storage system 300. For example, access to data stored within the home automation data storage system 300 can be limited to devices that are connected to the home automation data storage network. Physical proximity, for example, can provide some security. In some embodiments, connection to the home automation data storage network can be provided utilizing, for example, a Bluetooth pairing operation performed between the home automation controller 310 and the computing device 305. In some embodiments, the computing device 305 can be added to the home automation data storage network by accessing a user interface on the home automation controller 310 that allows the addition of the computing device 305 using a unique ID, a username and password, or some other authentication method. The user interface can be an interface as described above with respect to FIG. 2 that uses the television as a display device. In some embodiments, the user interface can be accessible by the computing device 305 via a webpage. The user interface can provide the ability to the homeowner or administrator of the home automation data storage system 300 to add computing devices to the network, identify the location of data on the home automation data storage system, allow the user to configure home automation components as, for example, unreliable, missing, or functioning. The user interface can also, for example, allow the homeowner or administrator to configure any RAID-type configuration that might be desired.

Figure 4:
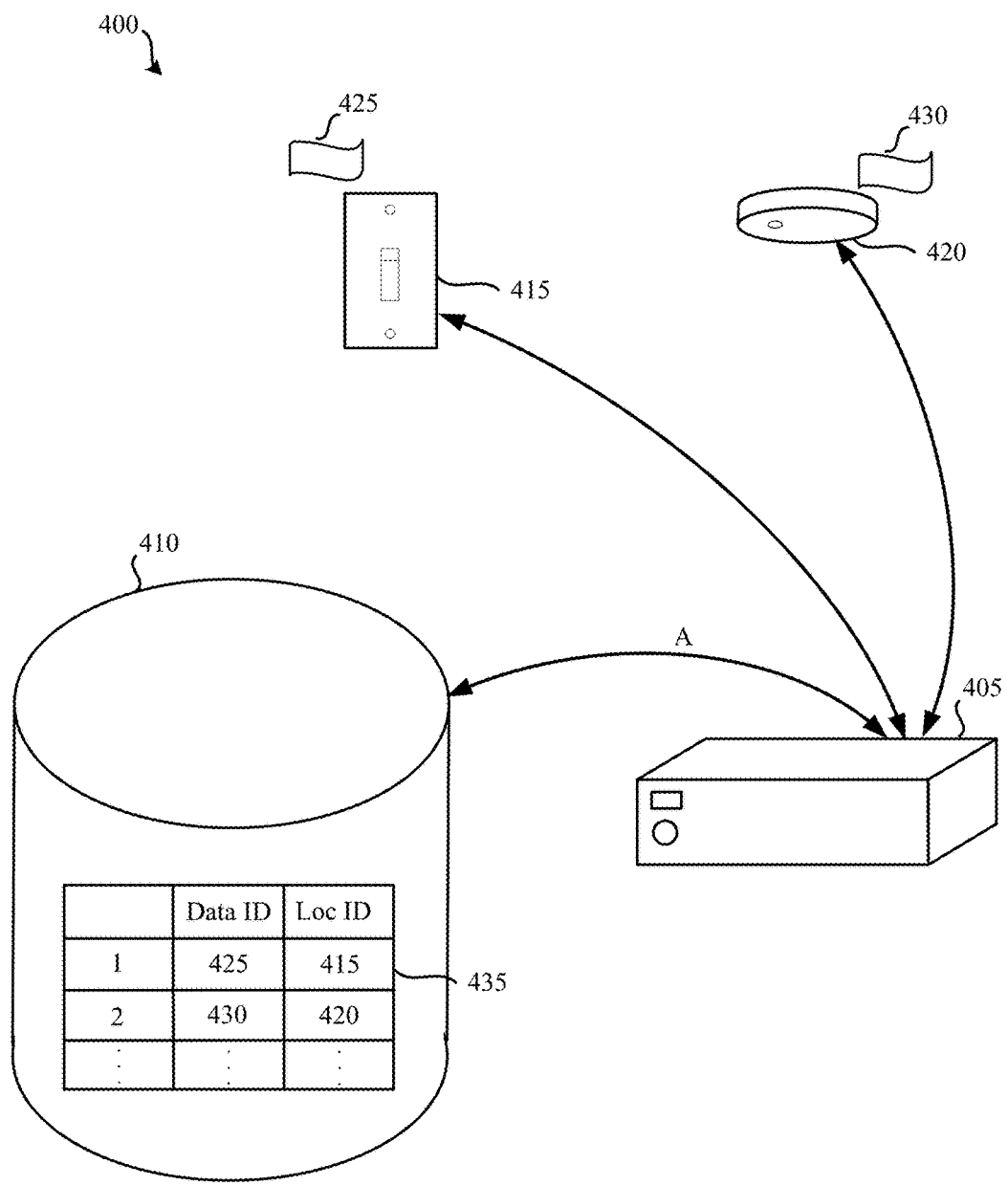
FIG. 4 illustrates another embodiment of a home automation data storage system.

FIG. 4 illustrates a home automation data storage system 400. Home automation data storage system 400 can include home automation controller 405, controller database 410, data segments 425 and 430, and home automation components including light switch 415 and smoke detector 420. Home automation controller 405 can be similar to home automation controller 310 as described with respect to FIG. 3. Data segments 425 and 430 can be similar to data segments 355, 360, and 365 as described with respect to FIG. 3. Home automation components 415 and 420 can be similar to home automation components 315, 320, 325, 330, 340 as described with respect to FIG. 3.

Controller database 410 can be stored on any suitable data storage device. In some embodiments, controller database 410 can be incorporated with home automation settings database 247 (FIG. 2) or stored on storage medium 225 (FIG. 2). Controller database 410 can be included within home automation controller 405 or stored on a storage device separately from home automation controller 405. Controller database 410 can be communicatively coupled to home automation controller 405 either wired or wirelessly. Controller database 410 can include home automation control data for use with the home automation system. Additionally, Controller database 410 can include information that associates data segments 425 and 430 with the storage device on which the data segments are stored.

For example, as shown in FIG. 4, data segment 425 can be stored on light switch 415. When home automation controller 405 stores data segment 425 on the storage device included in light switch 415, home automation controller 405 sends that information over communication link A to controller database 410 to store in table 435. Similarly, when home automation controller 405 stores data segment 430 into the storage device included in smoke detector 420, home automation controller 405 also creates an entry in table 435 associating smoke detector 420 and data segment 430. As shown in table 435, the Data ID of data segment 425 can be, for example 425. Loc ID can be the location ID for the storage device. For example, location ID for light switch 415 can be, for example, 415. An entry in table 435 can be, for example entry 1 which shows a data ID of 425 associated with location ID 415. The data ID can be any identifying value that identifies the data segment. Similarly, the location ID can be any identifying value that identifies the storage location.

Figure 5:
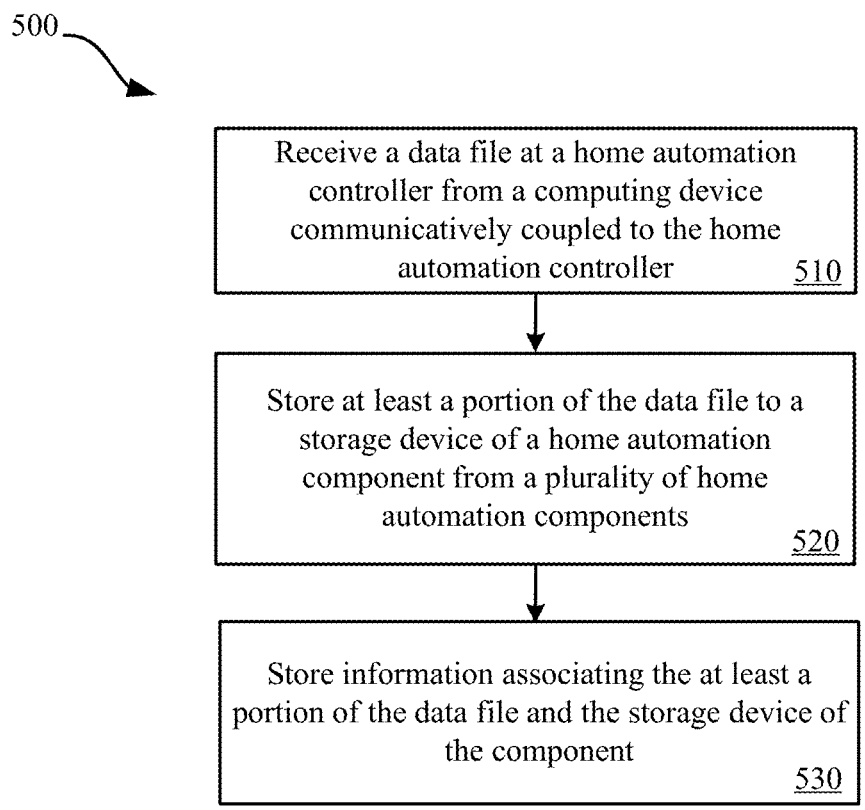
FIG. 5 illustrates a method for using a home automation data storage system.

FIG. 5 illustrates a method 500 for using a home automation data storage system, such as, for example, home automation data storage system 300 described above with respect to FIG. 3.

At 510, a home automation controller, such as home automation controller 310, can receive a data file from a computing device. The computing device can be any computing device, such as, for example, computing device 305 as described in FIG. 3 or the computing device described below with respect to FIG. 9. In some embodiments the computing device can maintain storage of the data file on a storage device within the computing device, such as, for example, storage device 925 as described with respect to FIG. 9 below. In some embodiments, the computing device may not include a storage device for storing persistent data and instead use the home automation data storage system as the primary storage for the computing device.

At 520, the home automation controller can store at least a portion of the data file to a storage device of a home automation component. The home automation component can be from home automation system that includes multiple components. The components can be home automation components as described above with respect to FIG. 3. The home automation controller can identify available storage space on a home automation component for storing the portion of the data file and send the portion of the data file to that component's storage space.

At 530, the home automation controller can store information associating the portion of the data file with the storage device of the component. The information can be stored in, for example, a controller database, such as the controller database 410 of FIG. 4. The information stored in the controller database associating the data portion or segment with the storage device of the component can allow the home automation controller to know where all the data that is stored on the home automation data storage system is at any given time.

Figure 6:
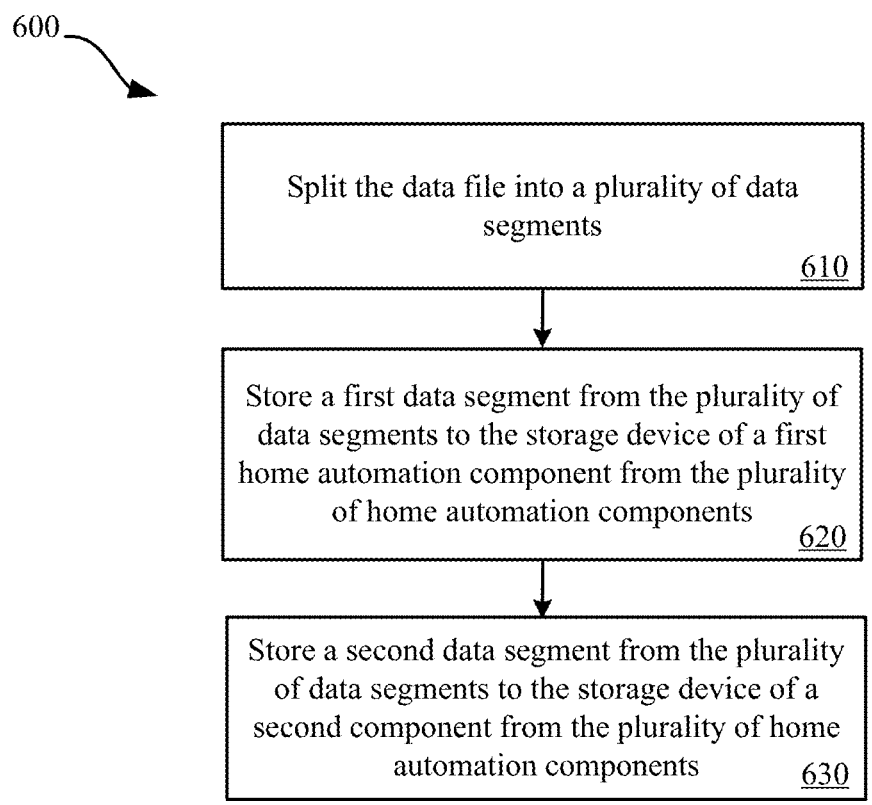
FIG. 6 illustrates another method for using a home automation data storage system.

FIG. 6 illustrates a method 600 for using a home automation data storage system, such as, for example, home automation data storage system 300 described above with respect to FIG. 3. The detail of FIG. 6 can describe more detail of steps that can occur at 520 of FIG. 5.

At 610, the home automation controller can split the data file into a plurality of data segments. Because the data file may not be stored on a single storage device, the home automation controller can split the data file into segments. There are multiple reasons for storing the data file across multiple storage devices. For example, the storage on some devices may not be large enough to accommodate the complete storage file. As another example, the home automation data storage system owner may prefer a configuration that is similar to a Redundant Array of Independent Disks ("RAID") to provide redundancy and/or rebuilding capability.

At 620, the home automation controller can store a first data segment from the plurality of data segments that the data file was split into to a first home automation component. For example, as shown in FIG. 3, data file segment 360 is shown as stored on the storage device 345 associated with the security camera 340. The data segment can be stored on a single home automation component, or it can be stored on multiple home automation components to ensure there is redundancy. If the storage devices housed within the home automation components are configured in a RAID-type configuration, there can be, for example, mirroring or other redundancy which can result in the same data segment being stored on multiple home automation component storage devices.

At 630, the home automation component can store a second data segment from the plurality of data segments that the data file was split into to a second home automation component. This can be done similarly to storing the first data segment described at 620.

Figure 7:
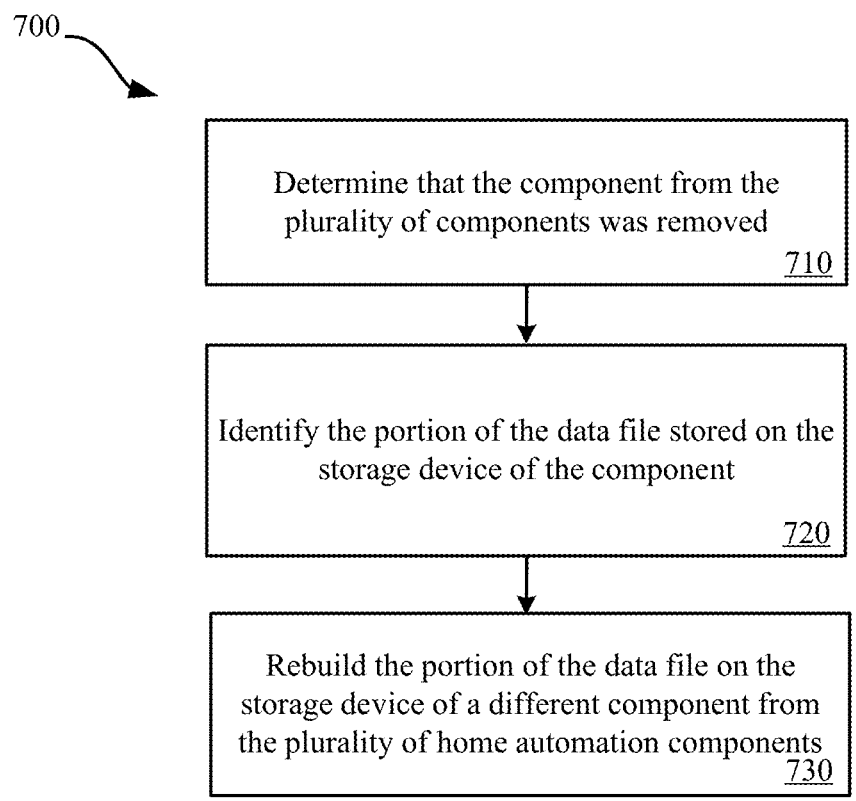
FIG. 7 illustrates yet another method for using a home automation data storage system.

In some embodiments, a home automation component can fail or be removed from the overall home automation system. FIG. 7 illustrates a method 700 for using a home automation data storage system in the event that a home automation component fails or is removed from the overall system. The method 700 can be incorporated with other methods described herein, for example, the method 500 described with respect to FIG. 5.

At 710, the home automation controller can determine that the home automation component was removed from the home automation data storage system. As mentioned above, there can be several reasons for a home automation component to be removed from the system. If, for example, the component is a light bulb, the light bulb can burn out. That type of failure would typically result in that component being replaced with a new light bulb. Another reason the component can be removed is simply because the component is no longer needed in the system. For example, if the homeowner determines that a security camera is no longer desired within the house, the security camera can be removed from the system. Or, perhaps a newer model security camera can replace the old security camera. Additionally, as another example, a component (such as a smoke detector) can be removed to replace a battery. After replacement of the battery, the component can be reinserted into the system. In any of these scenarios, an existing home automation component in the system can be removed, and the associated storage device containing any data is also removed. When the home automation controller determines that a component is gone from the system, the component can be marked as removed in, for example, the controller database.

In some embodiments, when a home automation component is failing, the component can intermittently work. In such embodiments, if the home automation controller detects that the component works only intermittently, the home automation controller can mark the component as unreliable and not use the component's storage device. In some embodiments, a home automation component can be temporarily removed from the home automation data storage system to, for example, replace a battery. In some embodiments, the home automation controller can determine that the component is unreliable after it is missing from the system for a certain period of time and at that point mark the component as removed, missing, or unreliable. In some embodiments, for example, a missing delay timer can be configured to allow for a certain amount of time the component has to be missing from the system before it is marked as unreliable, missing, or removed. In some embodiments, the missing delay time can be configured based on the type of component. For example, a light bulb may have a very short period of time before being marked as missing (because once burned out the light bulb is no good) while a smoke detector can be missing for a longer period of time before being marked as missing (because a user might remove it to replace a battery). Settings such as a missing delay timer can be configured automatically by the home automation controller or can be configured through the user interface.

In some embodiments, the storage device can be a removable card, such as for example an SD card. In such embodiments, if the home automation component fails and is replaced, the SD card can be inserted into the replacement component, maintaining the data in the system. In such embodiments, if the home automation controller had marked the component unreliable, missing, or removed, as discussed above, the homeowner or administrator of the system can utilize a user interface to override the designation on the home automation component within the system. Such designation can be stored in the controller database, for example.

In some embodiments, when the home automation component is intended to be removed and replaced, such as for example, when the component is being upgraded, the homeowner or administrator of the system can utilize the user interface to prepare the system for removal of the component. In such embodiments, the home automation controller can, for example, temporarily copy the information from the component that will be removed from the system. In such embodiments, when the replacement component is added to the system, the home automation controller can utilize the space on the replacement component or any other available space on the system. If the component is to be removed without replacement, the home automation controller can relocate the data stored on the component to be removed to the storage device of a different component. In some embodiments, if the component is intermittently working, the home automation controller can also move the data before the component completely fails.

At 720, the home automation controller can identify the portion of the data file stored on the storage device of the component. As described with respect to FIG. 4, a controller database can be used to identify the data stored on a specific home automation component storage device.

At 730, the home automation controller can rebuild the portion of the data file on the storage device of a different home automation component. The home automation controller can identify another home automation component storage device for storing the portion of the data file that was stored on the storage device of the component that was removed from the system. The home automation controller can rebuild the portion of the data file using any number of rebuilding techniques. For example, in some embodiments, a RAID-type configuration can be used with the available storage devices. In such embodiments, the portion of the file that was stored on the removed home automation component can also be stored on a second home automation component. The home automation controller can retrieve the data from the mirrored location and make a copy and place it in the storage device of a different home automation component.

In identifying the different home automation component for storing the data on at 730, the home automation controller can, for example, identify available space on any existing home automation component in the system. In some embodiments, a new home automation component will be added to the system to replace the removed home automation component. In such embodiments, the home automation controller can utilize the storage device on the new home automation component for storing the portion of the data file.

In some embodiments, the home automation controller can automatically begin the rebuild process to recover the data that was removed from the system. In such embodiments, the rebuilding can automatically occur after the home automation controller determines that the home automation component that had stored the data in its storage device is, for example, removed, missing, or unreliable. As discussed above, the designation of missing, removed, or unreliable can be made after a certain amount of time or immediately. In some embodiments in which the homeowner or administrator intentionally removes the device utilizing the user interface, the system can respond accordingly based on the entries into the user interface. In some embodiments, the home automation controller can notify the homeowner or administrator of the system that a component has failed. In some embodiments, the home automation controller can allow the homeowner or administrator to begin the rebuild process rather than launching the rebuild process automatically. When the homeowner or administrator is allowed to begin the rebuild process, the homeowner or administrator can be given options for specifying where the rebuilt data can be located, for example.

Figure 8:
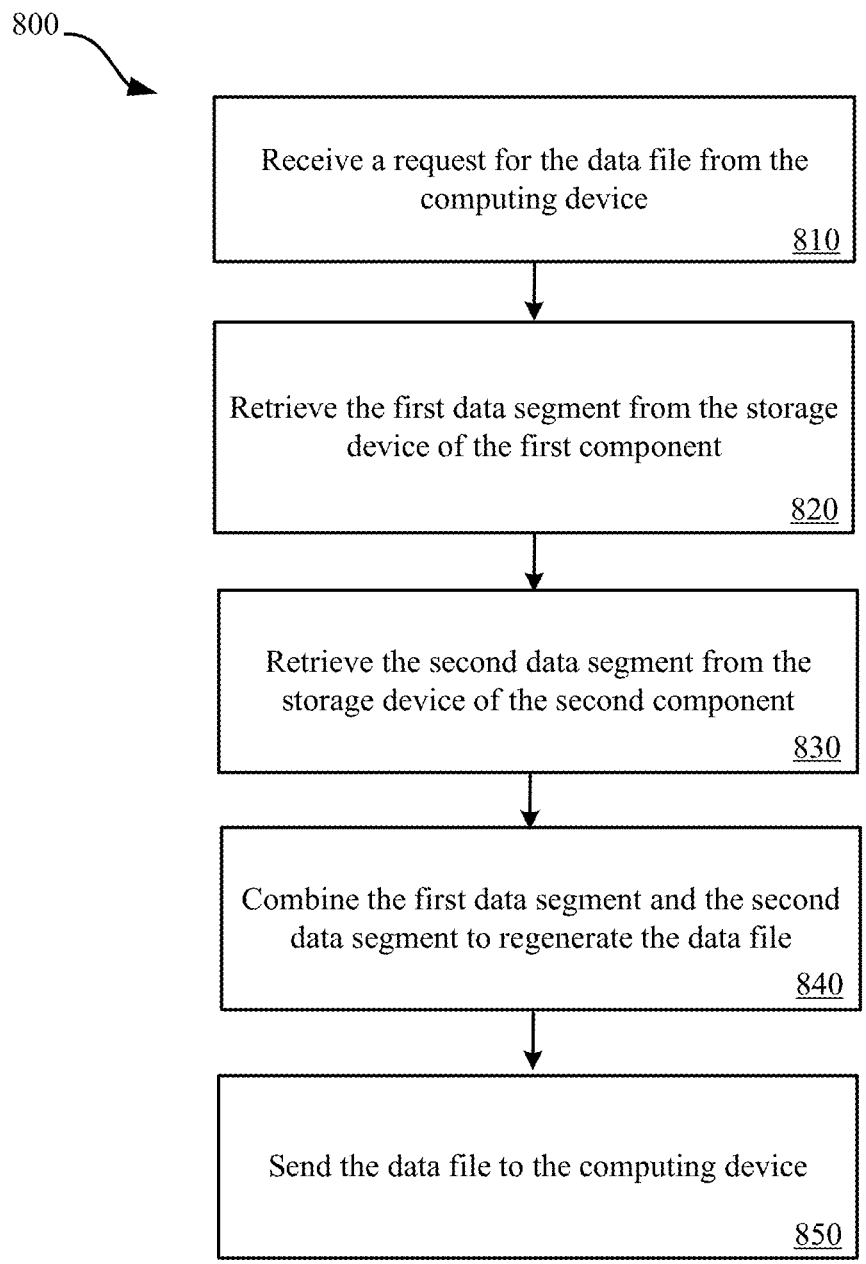
FIG. 8 illustrates yet another method for using a home automation data storage system.

FIG. 8 illustrates a method 800 for using the home automation data storage system to retrieve data at the computing device. The home automation data storage system can be, for example, home automation data storage system 300 as described with respect to FIG. 3. The method 800 can be incorporated with other methods described herein, for example, method 500 described with respect to FIG. 5.

At 810, the home automation controller, such as home automation controller 310, can receive a request for a data file from a computing device, such as computing device 305. The request can be a result of using the home automation data storage system as the primary storage for the computing device or as a request to retrieve data from the backup.

At 820, the home automation controller can retrieve a first data segment from the storage device of a first home automation component. Prior to retrieving the data segment, the home automation controller may utilize a controller database, such as controller database 410 as described with respect to FIG. 4, to identify on which component the data segment is located. The controller database can contain information identifying how many segments exist for the file and where each is located. Once the location has been identified, the home automation controller can retrieve the data segment from the storage device of the home automation component.

At 830, the home automation controller can retrieve a second data segment from the storage device of a second home automation component, similar to retrieving the first data segment at 820. This process can continue as many times as necessary to obtain all the data segments of the data file.

At 840, the home automation controller can combine the data segments to regenerate the data file. In some embodiments, the entire data file can be stored on a single home automation component and, therefore, regeneration may not be needed. Once the data file is regenerated, at 850, the home automation controller can transmit the data file to the computing device.

Figure 9:
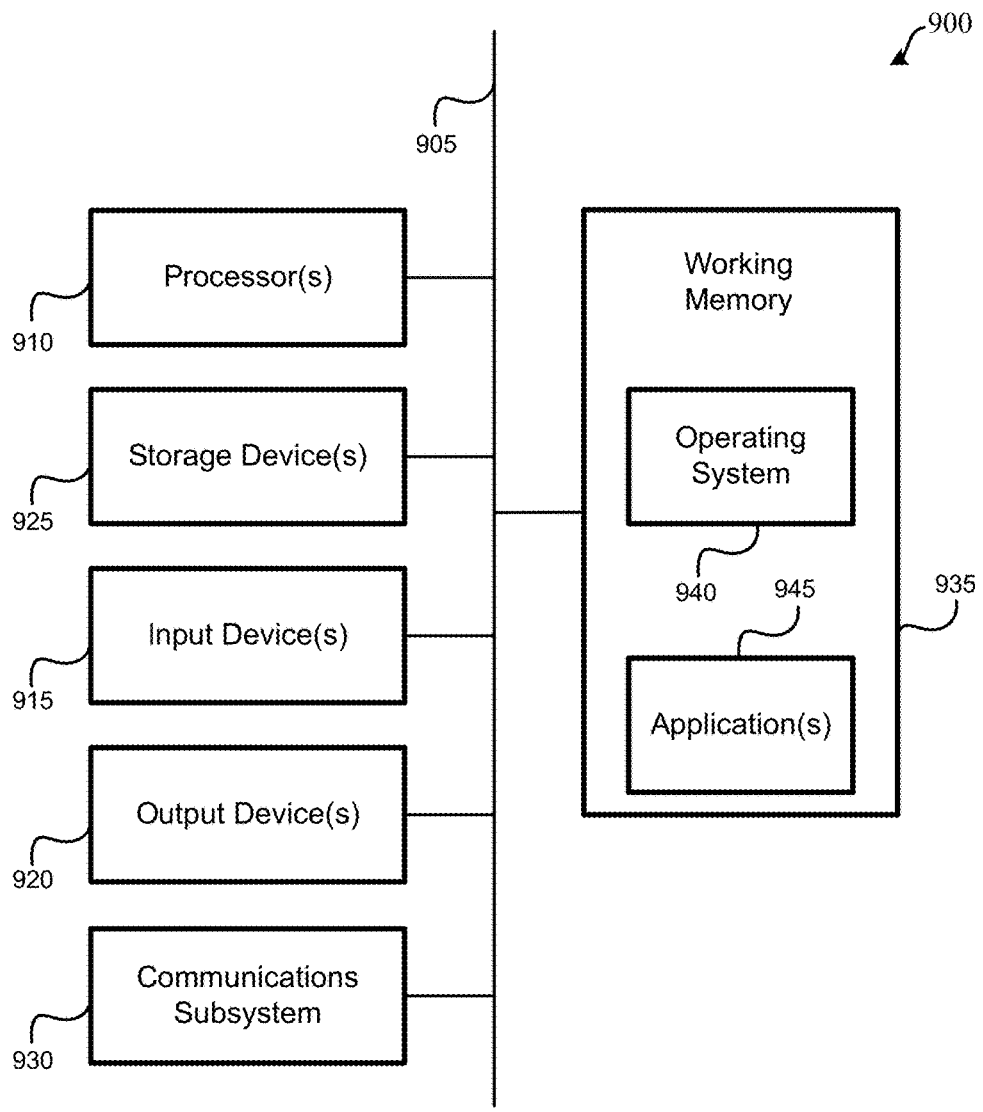
FIG. 9 illustrates an embodiment of a computer system.

FIG. 9 illustrates an embodiment of a computer system 900. A computer system 900 as illustrated in FIG. 9 may be incorporated into devices such as an STB, a first electronic device, DVR, television, media system, personal computer, and the like. Moreover, some or all of the components of the computer system 900 may also be incorporated into a portable electronic device, mobile phone, or other device as described herein. FIG. 9 provides a schematic illustration of one embodiment of a computer system 900 that can perform some or all of the steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905, or may otherwise be in communication, as appropriate. The hardware elements may include one or more processors 910, including without limitation one or more general-purpose processors and/or one or more special-purpose processors such as digital signal processing chips, graphics acceleration processors, and/or the like; one or more input devices 915, which can include without limitation a mouse, a keyboard, a camera, and/or the like; and one or more output devices 920, which can include without limitation a display device, a printer, and/or the like.

The computer system 900 may further include and/or be in communication with one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 930 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 930. In other embodiments, a portable electronic device, e.g. the first electronic device, may be incorporated into the computer system 900, e.g., an electronic device or STB, as an input device 915. In many embodiments, the computer system 900 will further comprise a working memory 935, which can include a RAM or ROM device, as described above.

The computer system 900 also can include software elements, shown as being currently located within the working memory 935, including an operating system 940, device drivers, executable libraries, and/or other code, such as one or more application programs 945, which may comprise computer programs provided by various embodiments, and/ or may be designed to implement methods, and/or configure systems, provided by other embodiments, as described herein. Merely by way of example, one or more procedures described with respect to the methods discussed above, such as those described in relation to FIG. 6, 7 or 8, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 900 to perform methods in accordance with various embodiments of the technology. According to a set of embodiments, some or all of the procedures of such methods are performed by the computer system 900 in response to processor 910 executing one or more sequences of one or more instructions, which might be incorporated into the operating system 940 and/or other code, such as an application program 945, contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 and/or components thereof generally will receive signals, and the bus 905 then might carry the signals and/or the data, instructions, etc. carried by the signals to the working memory 935, from which the processor(s) 910 retrieves and executes the instructions. The instructions received by the working memory 935 may optionally be stored on a non-transitory storage device 925 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A home automation data storage system, comprising:
a plurality of home automation components, each home automation component from the plurality of home automation components comprising a storage device;
a controller database for storing control data for a home automation system; and
an electronic device communicatively coupled to each home automation component from the plurality of home automation components and to a computing device and to the controller database, the electronic device comprising:
one or more processors; and
a memory coupled with and readable by the one or more processors and having stored therein a sequence of instructions which, when executed by the one or more processors, cause the one or more processors to:
receive a data file from the computing device;
split the data file into a plurality of data segments;
store a first data segment from the plurality of data segments in the storage device of a first home automation component from the plurality of home automation components;
store a second data segment from the plurality of data segments in the storage device of a second home automation component from the plurality of home automation components;
store information associating the storage device of the first home automation component and the first data segment in the controller database; and
store information associating the storage device of the second home automation component and the second data segment in the controller database.

2. The home automation data storage system of claim 1, wherein the storage device of the first home automation component from the plurality of home automation components is a removable memory card.

3. The home automation data storage system of claim 1, wherein the storage device of the first home automation component from the plurality of home automation components is not removable.

4. The home automation data storage system of claim 1, wherein the computing device does not maintain a copy of the data file at the computing device.

5. The home automation data storage system of claim 1, wherein the first home automation component from the plurality of home automation components is selected from the group consisting of light bulb, light switch, motion sensor, door sensor, and smoke detector.

6. The home automation data storage system of claim 1, wherein the first home automation component from the plurality of home automation components is removed from the plurality of home automation components, and wherein the sequence of instructions includes further instructions that, when executed by the one or more processors, cause the one or more processors to:
determine that the first home automation component from the plurality of home automation components was removed;
identify the first data segment stored on the storage device of the first home automation component; and
rebuild the first data segment on the storage device of a different home automation component from the plurality of home automation components.

7. The home automation data storage system of claim 1, wherein:
the electronic device is a home automation controller, and
the computing device maintains a copy of the data file at the computing device.

8. The home automation data storage system of claim 1, wherein the sequence of instructions includes further instructions that, when executed by the one or more processors, cause the one or more processors to:
receive a request for the data file from the computing device;
determine, using information stored in the controller database, that the data file includes the first data segment and the second data segment;
determine, using information stored in the controller database, that the first data segment is stored on the storage device of the first home automation component and the second data segment is stored on the storage device of the second home automation component;
retrieve the first data segment from the storage device of the first home automation component;
retrieve the second data segment from the storage device of the second home automation component;
combine the first data segment and the second data segment to regenerate the data file; and
send the data file to the computing device.

9. A method for storing data on a home automation system, comprising:
receiving a data file at a home automation controller from a computing device communicatively coupled to the home automation controller;
storing, by the home automation controller, at least a portion of the data file to a storage device of a first home automation component from a plurality of home automation components, the plurality of home automation components being communicatively coupled to the home automation controller;

storing, by the home automation controller in a controller database, information associating the at least a portion of the data file and the storage device of the first home automation component;

determining, by the home automation controller, that the first home automation component from the plurality of home automation components was removed from the plurality of home automation components;

identifying, by the home automation controller, the at least a portion of the data file stored on the storage device of the first home automation component; and rebuilding, by the home automation controller, the at least a portion of the data file on the storage device of a second home automation component from the plurality of home automation components.

10. The method for storing data on a home automation system of claim 9, wherein the storing at least a portion of the data file to the storage device of the first home automation component from the plurality of home automation components operation comprises:

splitting, by the home automation controller, the data file into a plurality of data segments;

storing, by the home automation controller, a first data segment from the plurality of data segments to the storage device of the first home automation component from the plurality of home automation components; and storing, by the home automation controller, a second data segment from the plurality of data segments to the storage device of a third home automation component from the plurality of home automation components.

11. The method for storing data on a home automation system of claim 10, wherein the storing information associating the storage device of the first home automation component and the at least a portion of the data file in the controller database operation comprises:

storing, by the home automation controller, information associating the first data segment with the storage device of the first home automation component in the controller database; and storing, by the home automation controller, information associating the second data segment with the storage device of the third home automation component in the controller database.

12. The method for storing data on a home automation system of claim 11, wherein the method further comprises:

receiving, by the home automation controller, a request for the data file from the computing device;

retrieving, by the home automation controller, the first data segment from the storage device of the second home automation component;

retrieving, by the home automation controller, the second data segment from the storage device of the third home automation component;

combining, by the home automation controller, the first data segment and the second data segment to regenerate the data file; and sending the data file to the computing device.

13. The method for storing data on a home automation system of claim 9, wherein the storage device of the first home automation component from the plurality of home automation components is a removable memory card.

14. The method for storing data on a home automation system of claim 9, wherein the storage device of the first home automation component from the plurality of home automation components is not removable.

15. The method for storing data on a home automation system of claim 9, wherein the computing device does not maintain a copy of the data file at the computing device.

16. The method for storing data on a home automation system of claim 9, wherein the first home automation component from the plurality of home automation components is selected from the group consisting of light bulb, light switch, motion sensor, door sensor, and smoke detector.

17. The method for storing data on a home automation system of claim 16, wherein:

the entire data file is stored on the storage device of the first home automation component.

* * * * *